United States Patent
Edwards

(10) Patent No.: US 12,079,463 B1
(45) Date of Patent: Sep. 3, 2024

(54) METHODS AND SYSTEMS FOR POSITIONING DISPLAY ELEMENTS

(71) Applicant: Adeia Guides Inc., San Jose, CA (US)

(72) Inventor: Warren Keith Edwards, Atlanta, GA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/216,100

(22) Filed: Jun. 29, 2023

(51) Int. Cl.
*G06F 3/0488* (2022.01)
*G06F 3/04842* (2022.01)
*G06F 3/04845* (2022.01)

(52) U.S. Cl.
CPC ........ *G06F 3/0488* (2013.01); *G06F 3/04842* (2013.01); *G06F 3/04845* (2013.01); *G06F 2203/04808* (2013.01)

(58) Field of Classification Search
CPC .............. G06F 3/0488; G06F 3/04842; G06F 3/04845; G06F 2203/04808
See application file for complete search history.

(56) References Cited

U.S. PATENT DOCUMENTS

| | | | | |
|---|---|---|---|---|
| 2010/0026647 A1* | 2/2010 | Abe | ...................... | G06F 3/0488 345/173 |
| 2012/0092346 A1* | 4/2012 | Ording | ................ | G06F 3/04842 345/473 |
| 2014/0173474 A1* | 6/2014 | Klemenz | ............... | G06F 3/0481 715/765 |
| 2014/0344754 A1* | 11/2014 | Lai | ...................... | G06F 3/04842 715/830 |
| 2015/0113483 A1* | 4/2015 | Van Der Westhuizen | ................... | G06F 3/04842 715/850 |
| 2015/0135132 A1* | 5/2015 | Josephson | ............. | H04W 4/021 715/784 |
| 2015/0261300 A1* | 9/2015 | Masuko | ................ | G06F 3/0482 345/156 |
| 2015/0331590 A1* | 11/2015 | Yasui | .................. | G06F 3/04817 715/765 |
| 2015/0355805 A1* | 12/2015 | Chandler | .............. | G06F 3/0485 715/784 |
| 2016/0328144 A1* | 11/2016 | Agrawal | ............... | G06F 3/0488 |
| 2017/0139556 A1* | 5/2017 | Josephson | ........... | H04L 12/2803 |

(Continued)

OTHER PUBLICATIONS

1-Guiard et al., "Asymmetric division of labor in human skilled bimanual action: The kinematic chain as a model," Journal of Motor Behavior, 21. 19(4), pp. 486-517.

(Continued)

*Primary Examiner* — Asher D Kells
(74) *Attorney, Agent, or Firm* — Haley Guiliano LLP

(57) ABSTRACT

System and methods are provided relating to bi-manual operation of a touchscreen. Multiple display elements displayed on the touchscreen are selected. A first input to the touchscreen is received defining a datum on the touchscreen, wherein the first input is resultant from sustained contact between a first hand of a user and the touchscreen. A second input to the touchscreen is received defining a reference point on the touchscreen, wherein the second input is resultant from sustained contact between a second hand of the user and the touchscreen. The multiple display elements are positioned to be displayed on the touchscreen in an evenly distributed manner relative to the datum and the reference point.

20 Claims, 13 Drawing Sheets

(56) References Cited

U.S. PATENT DOCUMENTS

2020/0089387 A1    3/2020    Andersson et al.

OTHER PUBLICATIONS

2-Guiard et al., "Asymmetry in bimanual skills," in Manual asymmetries in motor performance. Elliot and Roy, Editors. CRC Press, (1995).
3-Balakrishnan et al., Symmetric Bimanual Interaction. In Proceedings of CHI, 2002. ACM Press (2002). https://www.dgp.toronto.edu/~ravin/papers/chi2000_symmetricbimanual.pdf.
4-Matulic et al., "Hand Contact Shape Recognition for Posture-Based Tabletop Widgets and Interaction," Proceedings of the ACM Conference on Interactive Surfaces and Spaces. (2017).
5-Guarneri et al. "Multi Touch Shape Recognition for Projected Capacitive Touch Screen," Proceedings of the 9th International Conference on Computer Vision Theory and Applications (2014).

* cited by examiner

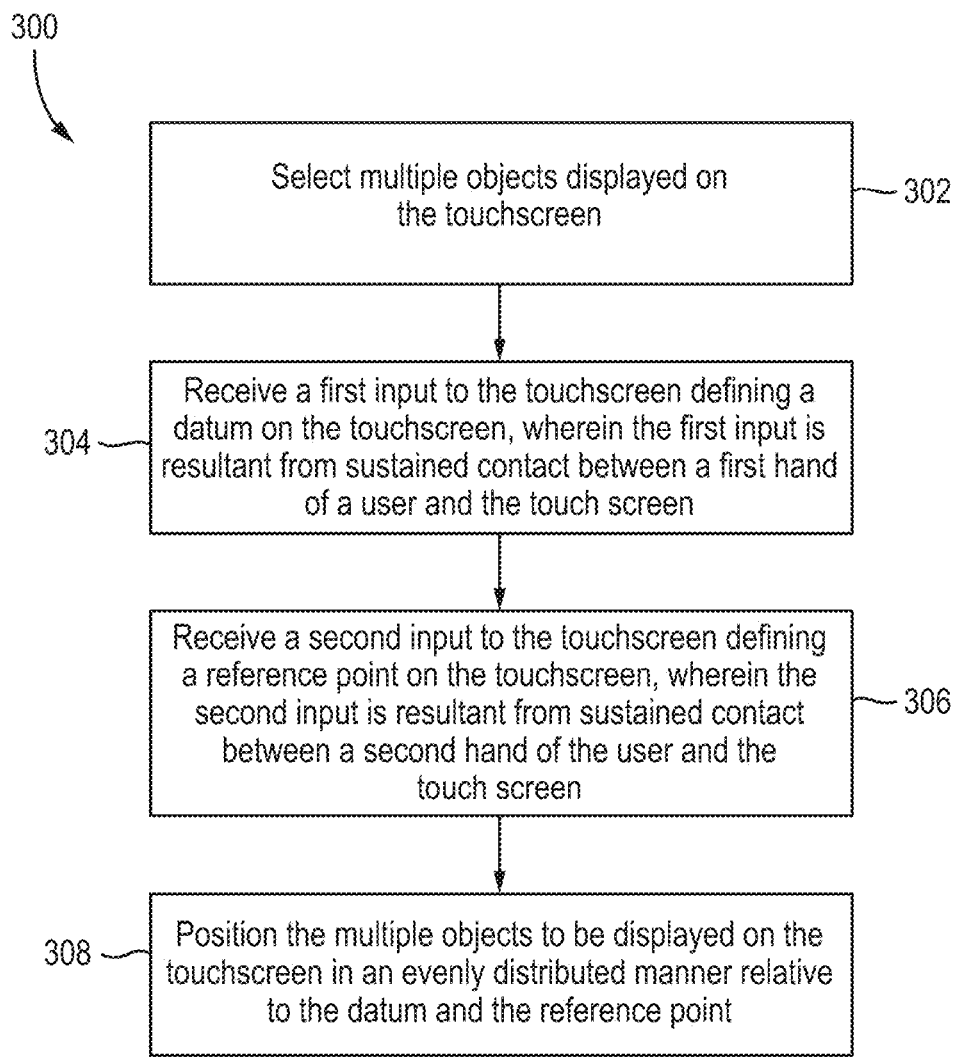

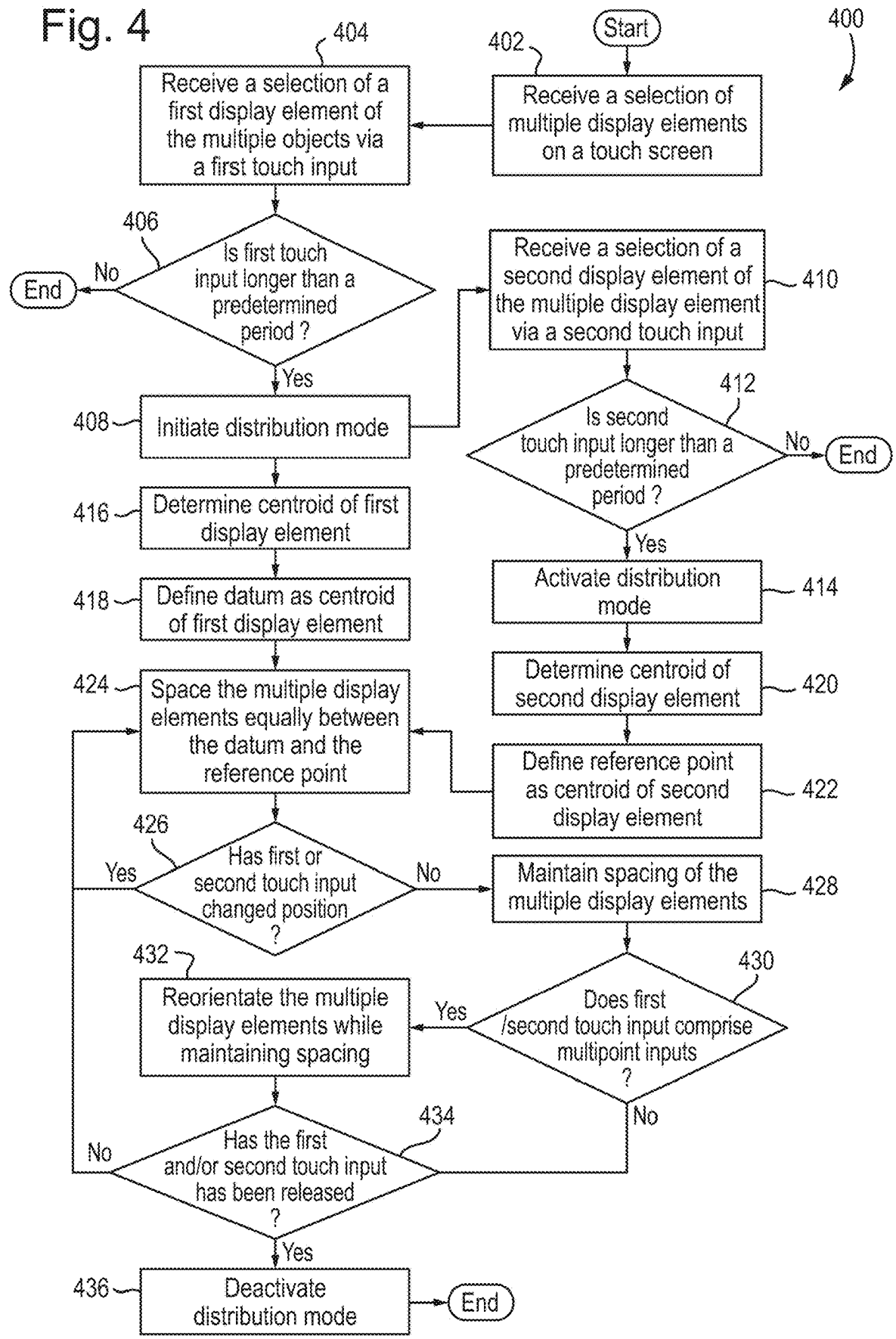

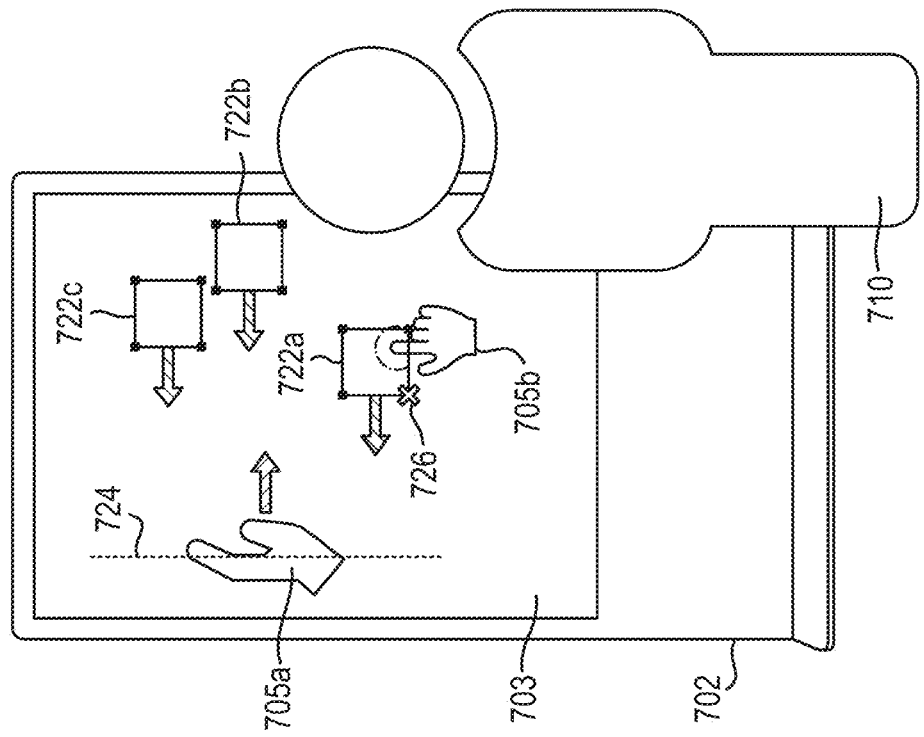
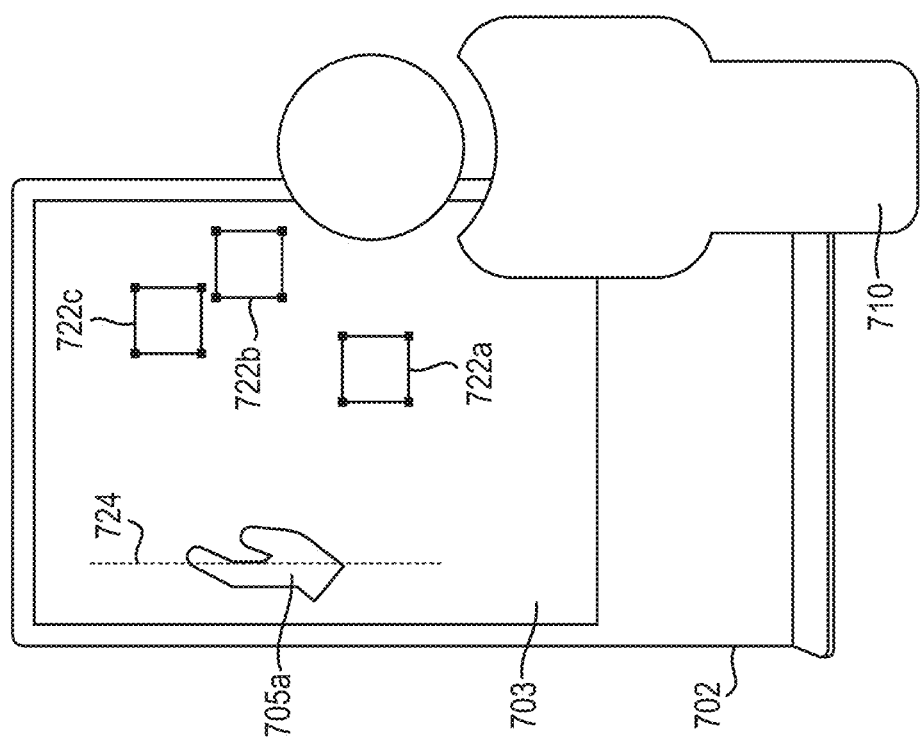

METHODS AND SYSTEMS FOR POSITIONING DISPLAY ELEMENTS

BACKGROUND

The present disclosure relates to methods and systems for positioning display elements on or using a touchscreen. Particularly, but not exclusively, the present disclosure relates to methods and systems for repositioning display elements using two-handed operations on a touchscreen. The methods and systems disclosed herein are applicable to positioning virtual display elements in an XR environment.

SUMMARY

At a high level, geometric distribution of display elements on a display is a task that involves a user positioning a set of display elements relative to each other. For example, in a roughly drawn flowchart, the user may wish to clean up the flowchart by selecting nodes along a main axis of the flow chart and then distributing them such that they are evenly spaced. This is a common operation in many programs that support graphical editing. For example, display elements of an application are selected, either via individual selection or a multi-select operation. Then the user navigates a menu-based system to determine how the display elements are arranged on screen, e.g., a user may navigate to a "home view" on a ribbon, then select an "arrange tool", then scroll to an "align" menu option, then scroll to either a "distribute horizontally" or "distribute vertically" menu option, and then finally select the desired option. Such operations can be cumbersome and ill-suited to some display systems, such as touchscreen interfaces, XR display systems and/or larger scale display systems used in a meeting or conference setting.

Systems and methods are provided herein for improving operations involving the positioning of display elements on a screen and/or in a virtual environment. For example, the systems and methods disclosed herein provide an intuitive control process for repositioning display elements, e.g., without the need for menu-based operations. In some examples, the systems and methods are applicable to large scale touchscreen displays, such as those used in an office or educational setting. However, for the avoidance of doubt, while the systems and methods disclosed herein are exemplified using large scale touchscreen displays, the disclosure is not limited to such, and is equally applicable to smaller touchscreens, such as tablets, laptops and smartphones, as well as other applications, such as XR environments.

In one approach, the systems and methods described herein relate to the bi-manual, i.e., two-handed, operation of a display, e.g., a touchscreen display and/or an XR display environment. However, the systems and methods may not necessarily be limited to two-handed operations or inputs made by different hands. For example, a user may make multiple sequential inputs using a single hand (or other body part) to achieve a similar effect as outlined herein.

In some examples, multiple display elements displayed on a touchscreen are selected, e.g., in response to a user input, such as voice command, an input to a controller, and/or any other appropriate selection technique. A first input to the touchscreen is received, defining a datum on the touchscreen. The first input is resultant from sustained contact between a first hand of a user and the touchscreen. For example, the first touch input may be a start of swipe gesture or a first touch point. In some examples, the first input is received after the selection of the display elements. In some examples, the first input is received before the selection of the display elements. For the avoidance of doubt, the present disclosure extends to examples where the input is received on a controller and the display elements are displayed on a separate screen, e.g., where the input (e.g., touch input) is made to a trackpad and the display elements are displayed on a screen (which may also be a touchscreen). Thus, the term "touchscreen" used herein should be understood to include any input and display system configured to receive an input and position display elements on a screen responsive to the input.

In some examples, a second input to the touchscreen is received, defining a reference point on the touchscreen. The second input is resultant from sustained contact between a second hand of the user and the touchscreen. For example, the second touch input may be an end of swipe gesture or second touch point.

In some examples, the multiple display elements are positioned to be displayed on the touchscreen in an evenly distributed manner relative to the datum and the reference point. In some examples, the multiple display elements are positioned to be displayed on the touchscreen in according to a distribution function, e.g., right grouped, left grouped, centre grouped, increasing or decreasing spacing, copy nearby distribution, etc.

In some examples, positioning the multiple display elements comprises spacing the multiple display elements equally between the datum and the reference point. For example, a first display element may be positioned on or at the datum, a second display element may be positioned on or at the reference point, and one or more further display elements may be spaced equally between the first display element and the second display element.

In some examples, receiving the first input comprises receiving a selection of a first display element of the multiple display elements. Receiving the second input may comprise receiving a selection of a second display element of the multiple display elements. In some examples, a centroid of the first display element is determined thereby defining the datum. In some examples, a centroid of the second display element is determined thereby defining the reference point.

In some examples, positioning the multiple display elements comprises determining an offset distance between the datum and the reference point. The multiple display elements may be aligned equally offset from the datum at the offset distance. In some examples, the offset may be a zero value, e.g., when the datum and the reference point are coincident.

In some examples, receiving the second input comprises receiving a selection of a first display element of the multiple display elements. In some examples, a centroid of the first display element is determined thereby defining the reference point. The offset distance may be determined based on the position of the centroid of the first display element relative to the datum.

In some examples, a shape of a contact area between the first hand of a user and the touchscreen may be determined. The datum may be defined in response to the shape of the contact area corresponding to one or more predetermined shapes. In some examples, an axis of the shape of a contact area between the first hand of a user and the touchscreen may be determined. A datum line may be aligned along the axis of the shape of a contact area, thereby defining the datum.

In some examples, the second input comprise a swipe gesture and the reference point is the end of the swipe gesture.

In some examples, the second input comprises multiple touch points, e.g., where each of the multiple touch points relates to a digit (finger or thumb) of a user. In some examples, positioning the multiple display elements to be displayed on the touchscreen comprises rotationally positioning the multiple display elements relative to each other in response to determining that the second input comprises multiple touch points.

In some examples, a first duration of the sustained contact of the first input is determined. In some examples, a second duration of the sustained contact of the second input is determined. In some examples, it is determined whether the first and second durations are greater than a predetermined period. In some examples, a distribution mode is activated in response to the first and second durations being greater than the predetermined period. In some examples, an end of the first or second input is determined, e.g., in response to a user ceasing to provide an input. In some examples, the distribution mode is deactivated in response to determining the end of the first or second input.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 3 is a flowchart representing a process for positioning display elements, in accordance with some examples of the disclosure;

FIG. 4 is a flowchart representing a process for positioning display elements on a touchscreen, in accordance with some examples of the disclosure;

FIGS. 7A to 7E depict a process for positioning display elements on a touchscreen, in accordance with some examples of the disclosure;

DETAILED DESCRIPTION

Systems and methods are provided herein for positioning display elements, e.g., on a display screen, in response to receiving one or more inputs from a user. For example, a display screen may be a touchscreen capable of receiving touch inputs from a user, either directly via a hand, finger, etc. of a user and/or a stylus, to position one or more display elements on the touchscreen. Additionally or alternatively, the systems and methods disclosed herein may be used to position display elements in an XR environment, e.g., in response to a user input into an XR system, such as an input into a haptic device and/or a gesture. In some examples, the systems and methods may be used to define a set of interaction gestures that provide a natural means of accomplishing grouping display elements (e.g., display objects or objects) in the manner described below. In some examples, user interactions with a system to position display elements may involve the use of multiple body parts of the user, e.g., both hands of the user (bi-manual interaction). As such, the system and methods may be appropriate for a larger multi-touch surfaces. However, the disclosure is not confined to such, and extends scope to any system and method involving the positioning of display elements, whether on a screen or in an XR environment. The disclosed systems and methods are also applicable for controlling display elements on a screen using a touch surface, e.g., a track pad.

Figure 1:
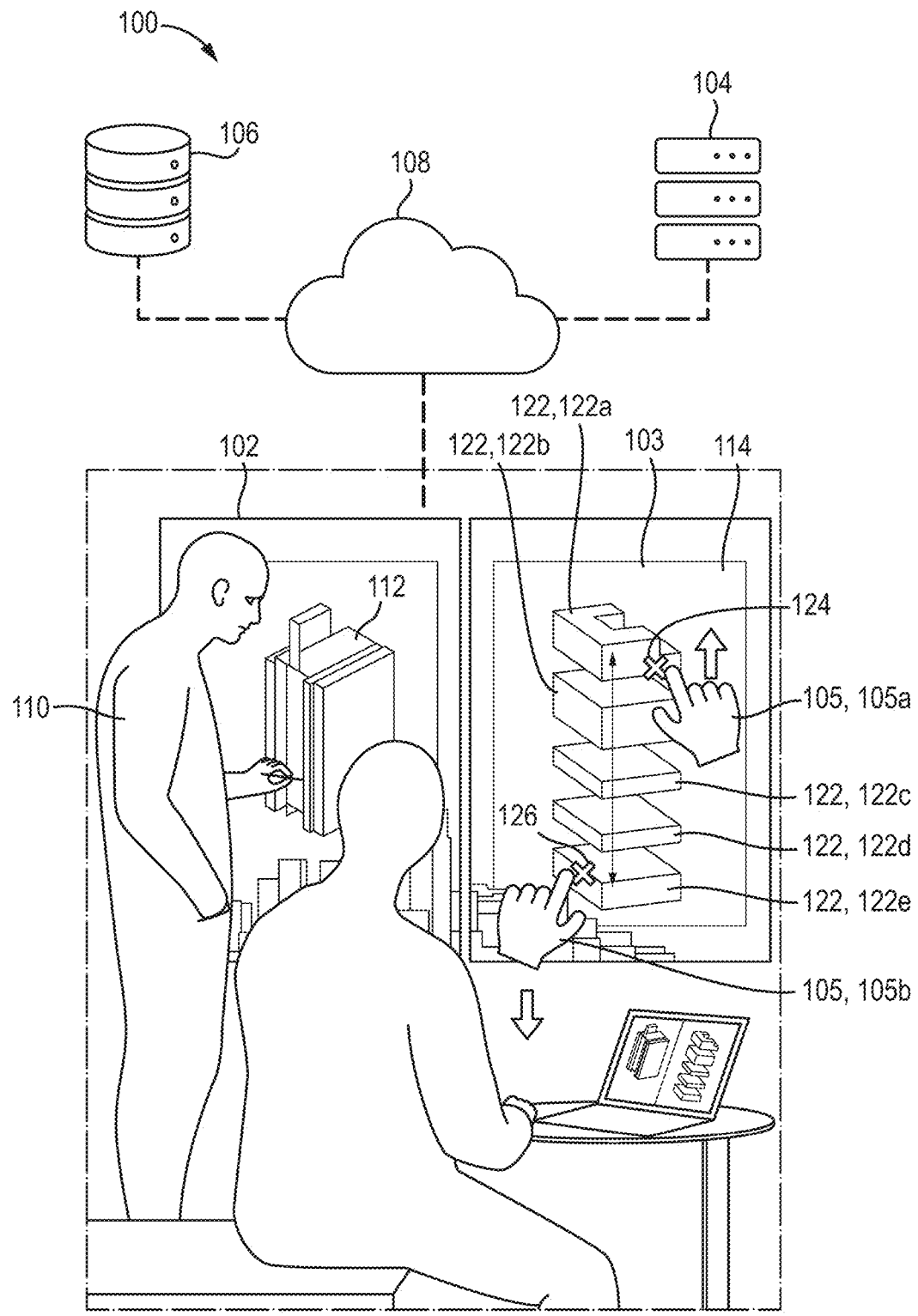
FIG. 1 illustrates an overview of the system for positioning display elements, in accordance with some examples of the disclosure.

FIG. 1 illustrates an overview of a system 100 for positioning display elements. The example shown in FIG. 1 illustrates a user 110 interacting with a user device 102 using touch inputs made into a touchscreen 103. However, the user device 102 may be any appropriate type of user device 102 configured to receive an input from a user, such as a smartphone or a tablet, via touch and/or gesture. In the example shown in FIG. 1, the user device 102 is a large-scale touchscreen 103 configured to receive touch inputs from multiple hands 105 of a user, directly from a user's finger (or other appropriate body part) or using a stylus (or other appropriate input device).

In the example shown in FIG. 1, user device 102 is communicatively coupled to a server 104 and a database 106, e.g., via network 108. In this manner, the user device 102 provides user 110 with access to (cloud) services, e.g., provided by an operator of server 104, which can retrieve data from one or more databases for responding to a user's input. Specifically, FIG. 1 shows an example of a user controlling architectural CAD software, whereby user 110 is controlling the software to create an exploded view of a model of a building. In particular, user 110 wishes to create a view of a building in which the levels of a building are shown in an equally distributed exploded manner along a desired axis, e.g., a vertical axis. However, many other use cases exist, such as the creation of diagrams, flowcharts, user interfaces, e.g., for video/sound editing or laboratory testing application, and/or the distribution of virtual objects in an XR environment.

Figure 2:
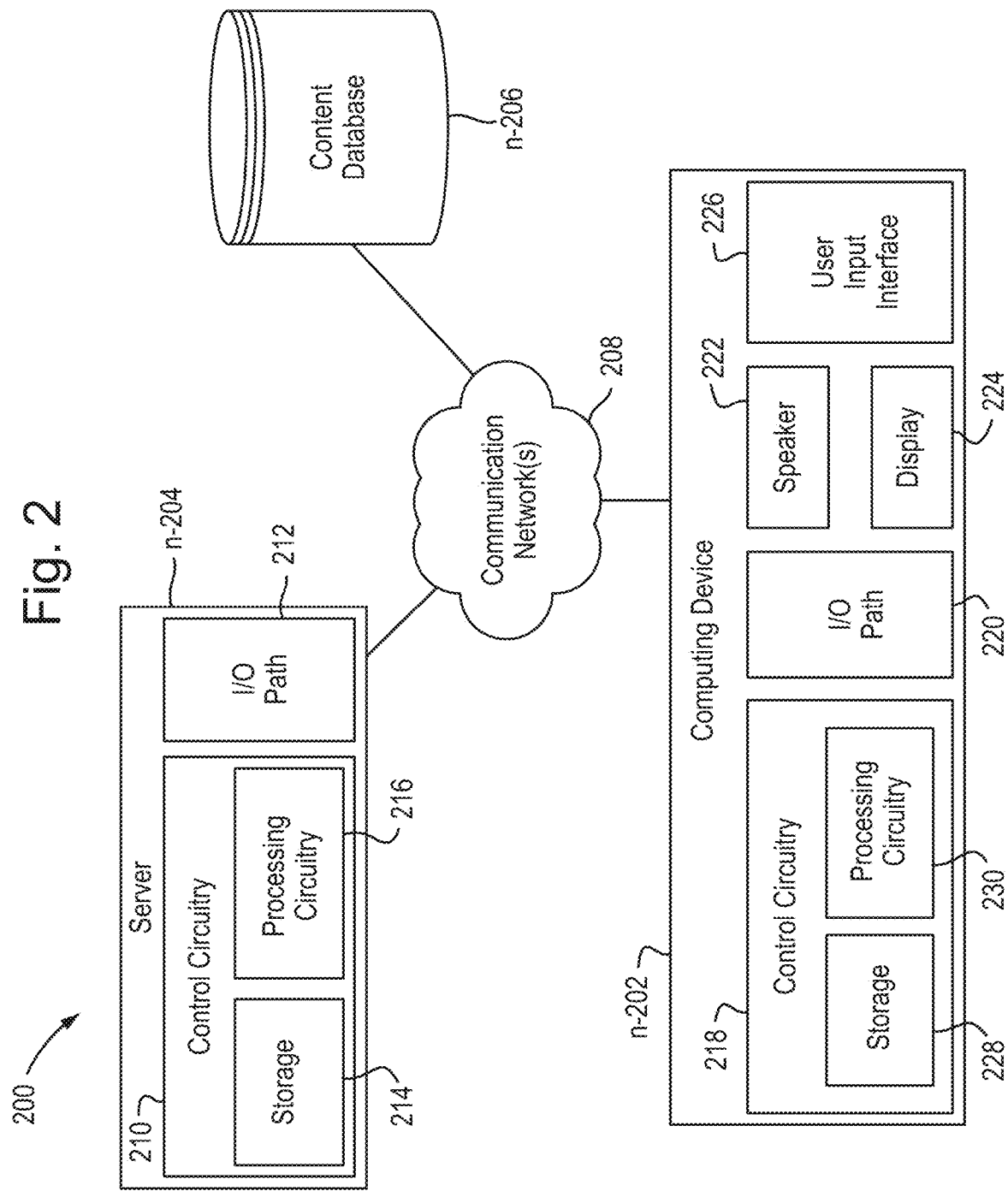
FIG. 2 is a block diagram showing components of an example system for positioning display elements, in accordance with some examples of the disclosure.

FIG. 2 is an illustrative block diagram showing example system 200, e.g., a non-transitory computer-readable medium, configured to receive a user input and position display elements responsive to that input. Although FIG. 2 shows system 200 as including a number and configuration of individual components, in some examples, any number of the components of system 200 may be combined and/or integrated as one device, e.g., as user device 102. System 200 includes computing device n-202 (denoting any appropriate number of computing devices, such as user device 102), server n-204 (denoting any appropriate number of servers, such as server 104), and one or more content databases n-206 (denoting any appropriate number of content databases, such as content database 106), each of which is communicatively coupled to communication network 208, which may be the Internet or any other suitable network or group of networks, such as network 108. In some examples, system 200 excludes server n-204, and functionality that would otherwise be implemented by server n-204 is instead implemented by other components of system 200, such as computing device n-202. For example, computing device n-202 may implement some or all of the functionality of server n-204, allowing computing device n-202 to communicate directly with content database n-206. In still other examples, server n-204 works in conjunction with computing device n-202 to implement certain functionality described herein in a distributed or cooperative manner.

Server n-204 includes control circuitry 210 and input/output (hereinafter "I/O") path 212, and control circuitry 210 includes storage 214 and processing circuitry 216. Computing device n-202, which may be an HMD, a personal computer, a laptop computer, a tablet computer, a smartphone, a smart television, or any other type of computing device, includes control circuitry 218, I/O path 220, speaker 222, display 224, and user input interface 226. Control circuitry 218 includes storage 228 and processing circuitry 220. Control circuitry 210 and/or 218 may be based on any suitable processing circuitry such as processing circuitry 216 and/or 230. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 214, 228, and/or storages of other components of system 200 (e.g., storages of content database n-206, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 2D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 214, 228, and/or storages of other components of system 200 may be used to store various types of content, metadata, and or other types of data. Non-volatile memory may also be used (e.g., to launch a boot-up routine and other instructions). Cloud-based storage may be used to supplement storages 214, 228 or instead of storages 214, 228. In some examples, control circuitry 210 and/or 218 executes instructions for an application stored in memory (e.g., storage 214 and/or 228). Specifically, control circuitry 210 and/or 218 may be instructed by the application to perform the functions discussed herein. In some implementations, any action performed by control circuitry 210 and/or 218 may be based on instructions received from the application. For example, the application may be implemented as software or a set of executable instructions that may be stored in storage 214 and/or 228 and executed by control circuitry 210 and/or 218. In some examples, the application may be a client/server application where only a client application resides on computing device n-202, and a server application resides on server n-204.

The application may be implemented using any suitable architecture. For example, it may be a stand-alone application wholly implemented on computing device n-202. In such an approach, instructions for the application are stored locally (e.g., in storage 228), and data for use by the application is downloaded on a periodic basis (e.g., from an out-of-band feed, from an Internet resource, or using another suitable approach). Control circuitry 218 may retrieve instructions for the application from storage 228 and process the instructions to perform the functionality described herein. Based on the processed instructions, control circuitry 218 may determine what action to perform when input is received from user input interface 226.

In client/server-based examples, control circuitry 218 may include communication circuitry suitable for communicating with an application server (e.g., server n-204) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 208). In another example of a client/server-based application, control circuitry 218 runs a web browser that interprets web pages provided by a remote server (e.g., server n-204). For example, the remote server may store the instructions for the application in a storage device. The remote server may process the stored instructions using circuitry (e.g., control circuitry 210) and/or generate displays. Computing device n-202 may receive the displays generated by the remote server and may display the content of the displays locally via display 224. This way, the processing of the instructions is performed remotely (e.g., by server n-204) while the resulting displays, such as the display windows described elsewhere herein, are provided locally on computing device n-202. Computing device n-202 may receive inputs from the user via input interface 226 and transmit those inputs to the remote server for processing and generating the corresponding displays.

A computing device n-202 may send instructions, e.g., to generate subtitles, to control circuitry 210 and/or 218 using user input interface 226. User input interface 226 may be any suitable user interface, such as a remote control, trackball, keypad, keyboard, touchscreen, touchpad, stylus input, joystick, voice recognition interface, gaming controller, or other user input interfaces. User input interface 226 may be integrated with or combined with display 224, which may be a monitor, a television, a liquid crystal display (LCD), an electronic ink display, or any other equipment suitable for displaying visual images.

Server n-204 and computing device n-202 may transmit and receive content and data via I/O path 212 and 220, respectively. For instance, I/O path 212, and/or I/O path 220 may include a communication port(s) configured to transmit and/or receive (for instance to and/or from content database n-206), via communication network 208, content item identifiers, content metadata, natural language queries, and/or other data. Control circuitry 210 and/or 218 may be used to send and receive commands, requests, and other suitable data using I/O paths 212 and/or 220.

FIG. 3 shows a flowchart representing an illustrative process 300 for positioning display elements. While the example shown in FIG. 3 refers to the use of system 100, as shown in FIG. 1, it will be appreciated that the illustrative process 300 shown in FIG. 3 may be implemented, in whole or in part, on system 100, system 200, and/or any other appropriately configured system architecture. For the avoidance of doubt, the term "control circuitry" used in the below description applies broadly to the control circuitry outlined above with reference to FIG. 2. For example, control circuitry may comprise control circuitry of user device 102 and control circuitry of server 104, working either alone or in some combination.

At 302, control circuitry, e.g., control circuitry of user device 102, receives a user input to select multiple display elements 122 displayed on touchscreen 103 of user device 102. The display elements 122 may be selected in any appropriate manner. For example, user 110 may select each display element 122, e.g., sequentially, using a touch input. Alternatively, user 110 may select the display elements 122 in a single action, e.g., by drawing a shape around the display elements. In the example shown in FIG. 1, user 110 selects a virtual element on the screen, e.g., a CAD model of a building structure. In this example, selection of the CAD model automatically selects the components, e.g., levels, from which the model is constructed. In this example, each level of the building structure is assigned a display element 122. However, in other examples, one or more components of the CAD model may be assigned a display element according to a user input and/or a setting of user device 102. For example, user 110 may select a subset of the components from which the model is constructed. Selection of a display element is described below in more detail in relation to the example shown in FIGS. 4A to 4E.

At 304, control circuitry, control circuitry of user device 102, receives a user input, e.g., a first input, to the touchscreen 103 defining a datum 124 on the touchscreen 103. In the example shown in FIG. 1, the first input is by virtue of sustained contact between a first hand 105a of a user and the touchscreen 103. For example, a contact period longer than a predetermined period, e.g., 2 seconds (or any other appropriate period), may activate a setting, e.g., on user device 102, in which an distribution mode is initiated. Once the distribution mode is initiated, e.g., by maintaining contact between the first hand 105a of a user and the touchscreen 103, control circuitry may be primed to receive a second input causing the distribution mode to be activated (e.g., see 306 below). In other words, following the input(s) causing the selection of the display elements 122 at 302, a user input, e.g., a next user input, that is longer than the predetermined period may cause the control circuitry to switch from a selection mode to a distribution mode. In the example shown in FIG. 1, user 110 has provided a user input with their first hand 105a by selecting and holding display element 122a, causing control circuitry to initiate an distribution mode in which the display elements 122 are to be arranged. The action of selecting and holding display element 122a defines the datum 124 on the touchscreen 103, the datum 124 being the point at which user 110 has selected display element 122a. However, in other examples, the datum 124 may be any point, line or region on the touchscreen 103, e.g., a point, line or region away from a display element 122, corresponding to a location of the first input on the screen 103. In some examples, control circuitry may provide an indication to user 110 that the distribution mode has been initiated, e.g., by causing display elements 122a to jiggle, or in any other appropriate manner.

At 306, control circuitry, e.g., control circuitry of user device 102, receives a user input, e.g., a second input, to the touchscreen 103 defining a reference point 126 on the touchscreen 103. In the example shown in FIG. 1, the second input is by virtue of sustained contact between a second hand 105b of a user and the touchscreen 103 and is received while the user 110 maintains contact between the first hand 105a of a user and the touchscreen 103. For example, a contact period longer than a predetermined period, e.g., 2 seconds (or any other appropriate period), may initiate a setting, e.g., on user device 102, in which a distribution mode is activated (e.g., following initiation of the distribution mode at 304). In other words, in response to receiving the first input, control circuitry is primed to receive a second input, e.g., a next user input, that is longer than a predetermined period to cause the control circuitry to distribution mode to be activated. For the avoidance of doubt, it is the action of receiving the first user input, e.g., from the first hand 105a of the user 110, and the second user input, e.g., from the second hand 105b of the user 110, that causes control circuitry to initiate and then activate the distribution mode, in this example at least. In the context of the present disclosure, "activation of the distribution mode" is understood to mean activation of a mode in which user 110 can cause arrangement (and rearrangement) of the display elements 122, e.g., by virtue of further user input such as dragging or swiping their second hand 105b across the screen 103. In the example shown in FIG. 1, user 110 has provided a user input with their second hand 105b by selecting and holding display element 122e, causing control circuitry to activate the distribution mode in which the display elements 122 are able to be positioned on the touchscreen 103. The action of selecting and holding display element 122e defines reference point 126 on the touchscreen 103, the reference point 126 being the point at which user 110 has selected display element 122e. However, in other examples, the reference point 126 may be any point on the touchscreen 103, e.g., a point away from a display element 122, corresponding to a location of the second touch input on the screen 103. In some examples, control circuitry may provide an indication to user 110 that the distribution mode has been activated, e.g., by causing the display elements 122 (e.g., display elements 122a-122e) to jiggle, or in any other appropriate manner.

At 308, control circuitry, e.g., control circuitry of user device 102, causes the multiple display elements 122 to be positioned and displayed on the touchscreen 103 in an evenly distributed manner relative to the datum 124 and the reference point 126. In the example shown in FIG. 1, while maintaining contact between the touchscreen and both hands 105a, 105b, the user 110 drags their hands 105a, 105b in opposite directions (indicated by arrow A), to increase the spacing between their hands. For example, user may move their first hand 105a in an upward manner, while moving their second hand in a downward manner across the touchscreen. In response to the user 110 repositioning their hands 105a, 105b, the datum 124 and the reference point 126 are repositioned on the touchscreen. In response to this, each of the selected display elements 122a-122e are distributed in an even manner between the repositioned datum 124 and reference point 126. For example, the further apart the user 110 moves their hands 105a, 105b, the greater the spacing becomes between the selected display elements 122a-122e.

To add context, in the example shown in FIG. 1, user 110 has selected a view 112 of a building structure from which an exploded view 114 is to be created. User 110 is able to create exploded view 114 of the building structure by selecting, e.g., via touch inputs with separate hands 105a, 105b, a first display element 122a, e.g., a top level of the building structure, and a second display element 122e, e.g., a bottom level of the building structure, and dragging those two display elements 122a, 122e apart from each other. In response to the user 110 selecting and moving the two display elements 122a, 122e in opposite directions (or at least directions having an opposite component), each of the levels of building structure, e.g., the levels interstitial to top and bottom levels, are distributed in an even manner between top and bottom levels. User 110 may continue to move display elements 122*a* and 122*e* by any desired amount to set the spacing of the display elements 122*b*, 122*c*, 112*d* interstitial to display elements 122*a* and 122*e*.

In some examples, control circuitry may cause the distribution mode to cease in response to user 110 removing at least one of their hands 105*a*, 105*b* from the touchscreen 103, e.g., for a period longer than a predetermined period. For example, the user removing hand 105*a* or 105*b*, e.g., for longer than 2 seconds, may cause control circuitry of user device 102 to deactivate distribution mode, and optionally switch from distribution mode to another mode. In some examples, control circuitry may cause a notification to be presented to user 110 indicating that distribution made has been deactivated. For example, display elements 122 may cease to jiggle, etc. In this manner, the spacing of the display elements 112 may be set on the screen 103 responsive to user 110 defining the datum 124 and the reference point 124 with respective touch inputs, positioning the datum 124 relative to the reference point 126 on the touchscreen 103, and releasing at least one of the touch inputs. As such, system 100 provides an intuitive mechanism by which a user can position objects relative to one other on a screen (or any other appropriate environment), e.g., without the use of menus. Various approaches of the systems and methods disclosed herein are provide below. The actions or descriptions of FIG. 3 may be done in any suitable alternative orders or in parallel to further the purposes of this disclosure.

FIG. 4 shows a flowchart representing an illustrative process 400 for positioning display elements. While the example shown in FIG. 4 refers to the use of system 500, as shown in FIGS. 5A-5E, it will be appreciated that the illustrative process 400 shown in FIG. 4 may be implemented, in whole or in part, on system 100, system 200, and/or any other appropriately configured system architecture. For the avoidance of doubt, the term "control circuitry" used in the below description applies broadly to the control circuitry outlined above with reference to FIG. 2. For example, control circuitry may comprise control circuitry of user device 102 and control circuitry of server 104, working either alone or in some combination.

At 402, control circuitry, e.g., control circuitry of user device 502, receives a selection of multiple display elements on a screen 503, e.g., in a manner similar to that described above at 302. In the example shown in FIG. 5A, the display elements 522*a-e* are selected by touching and holding a first display element 522*a* with a first hand 505*a*, and sequentially touching the other display elements 522*b*, 522*c*, 522*d* and 522*e* with another hand 505*b*. Display element 522*a*, 522*b* and 522*c* are highlighted indicating that user 510 has selected these display elements, and has not yet selected display elements 522*d* and 522*e*. In some examples, user 510 may select multiple display elements by selecting the display elements at the extent of a range of positions of the display elements. For example, control circuitry may be configured to select, e.g., automatically, display elements 522*b*, 522*c* and 522*d* in response to user 510 selecting display elements 422*a* and 422*e*, by virtue of display elements 522*b*, 522*c* and 522*d* being display elements in between, e.g., interstitial to, the selected, e.g., outermost, display elements 522*a* and 522*e*. It is appreciated that other display elements may be visible on screen 403, and the display elements shown in FIGS. 4A to 4E are shown merely by way of example and the layout of the display elements is not limited to such.

To add context to the example shown in FIGS. 4A to 4E, each of the display elements may represent a portion or level of the CAD model shown in FIG. 1. For example, display element 522*a* may represent a top level of the building structure shown in FIG. 1, and display element 522*e* may represent a bottom level of the building structure. In other examples, the display elements may represent portions of a flowchart, a work flow, a process diagram, an organizational chart, a technical drawing, icons representing media content items in a program guide, elements of a graphical user interface, audio effects (such as a drum beat), visual effects (such as lighting effects), elements of a video game (such as selectable digital objects), photos in an album, objects on a mood board, and/or any other appropriate application where display elements (e.g., objects on a screen and/or in an XR environment) may be positioned.

In some examples, receiving a selection of the multiple display elements at 402 is a separate action from the actions involved in distributing the display elements, e.g., 404 and/or 410. For example, the selecting of display elements may occur as an independent action. As such, steps 404 and 410 described below may occur as discrete steps after step 402. However, in other examples, step 404 and/or 410 may occur as part of the selection of the multiple display elements. For example, a touch input, e.g., a tap and hold, to display element 522*a* may initiate a selection mode and initiate a distribution mode. Another touch input, e.g., a tap and hold, to the display element 522*e* may finish the selection mode and activate the distribution mode. In other words, the user input causing the selecting of display element 422*a* at 402 may comprise the user input described below for 404, and the user input causing the selecting of display element 422*e* at 402 may comprise the user input described below for 410. The below example follows that the selection of the multiple items occurs as a separate step from the 404 and 410. However, examples contrary to this are not excluded from the scope of the disclosure.

At 404, control circuitry, e.g., control circuitry of user device 502, receive a selection of a first display element of the multiple display elements via a first touch input to screen 503. In the example shown in FIG. 5B, user 510 selects display element 522*a* as the first display element with hand 505*a*. However, in another example, the first touch input may be received anywhere on screen 503, such as at another of the display elements or at a point away from the display elements on the screen, or at another screen connected to screen 503, such as when multiple displays are used together.

At 406, control circuitry, e.g., control circuitry of user device 502, determines whether the first touch input is longer than a predetermined period, such as 2 seconds. When the touch input is less than the predetermined period, process 400 ends and control circuitry returns to a standby mode, or back to 404. When the first touch input is equal to or greater than the predetermined period, process 400 moves to 408.

At 408, control circuitry, e.g., control circuitry of user device 502, initiates a distribution mode, e.g., in response to the first touch in put being equal to or greater than the predetermined period. As described above, initiation of the distribution mode is different from activation of the distribution mode. For example, when the distribution mode is initiated, control circuitry may be primed to receive a corresponding touch input to activate the distribution mode. In the example shown in FIG. 5B, the first input of the user 510 comprises a tap and hold gesture, wherein the action of holding is greater than the predetermined period. In some examples, once the distribution mode has been activated (e.g., as indicated by a notification or an animation), user 510 may remove hand 505*a* from the screen 503. However, in the example of FIGS. 5A to 5E, user 510 maintains hand 505a in contact with the screen 503. Following initiation of the distribution mode, process 400 moves to 410 and 416.

At 410, control circuitry, e.g., control circuitry of user device 502, receive a selection of a second display element of the multiple display elements via a second touch input to screen 503. In the example shown in FIG. 5B, user 510 selects display element 522e as the second display element with hand 505b. However, in another example, the second touch input may be received anywhere on screen 503, such as at another of the display elements or at a point away from the display elements on the screen, or at another screen connected to screen 503, such as when multiple displays are used together.

At 412, control circuitry, e.g., control circuitry of user device 502, determines whether the second touch input is longer than a predetermined period, such as 2 seconds. When the touch input is less than the predetermined period, process 400 ends and control circuitry returns to a standby mode, or back to 410. When the second touch input is equal to or greater than the predetermined period, process 400 moves to 414.

At 414, control circuitry, e.g., control circuitry of user device 502, activates the distribution mode, e.g., in response to receiving the first touch input for a period longer than a first predetermined period, and the second touch input for a period longer than a second predetermined period (which may be set as the same duration or a different duration as the first predetermined period).

Returning to the process flow from 408, at 416, control circuitry, e.g., control circuitry of user device 502, determines a centroid of the first display element 522a. For example, control circuitry may determine a location of the first touch input on the screen 503, and determine whether the location of the first touch input is within a boundary of the first display element 522a. In response to determining that the first touch input is within a boundary of the first display element 522a, the centroid of the first display element 522a is determined as the geometric mean of all points along the boundary.

Figure 5A:
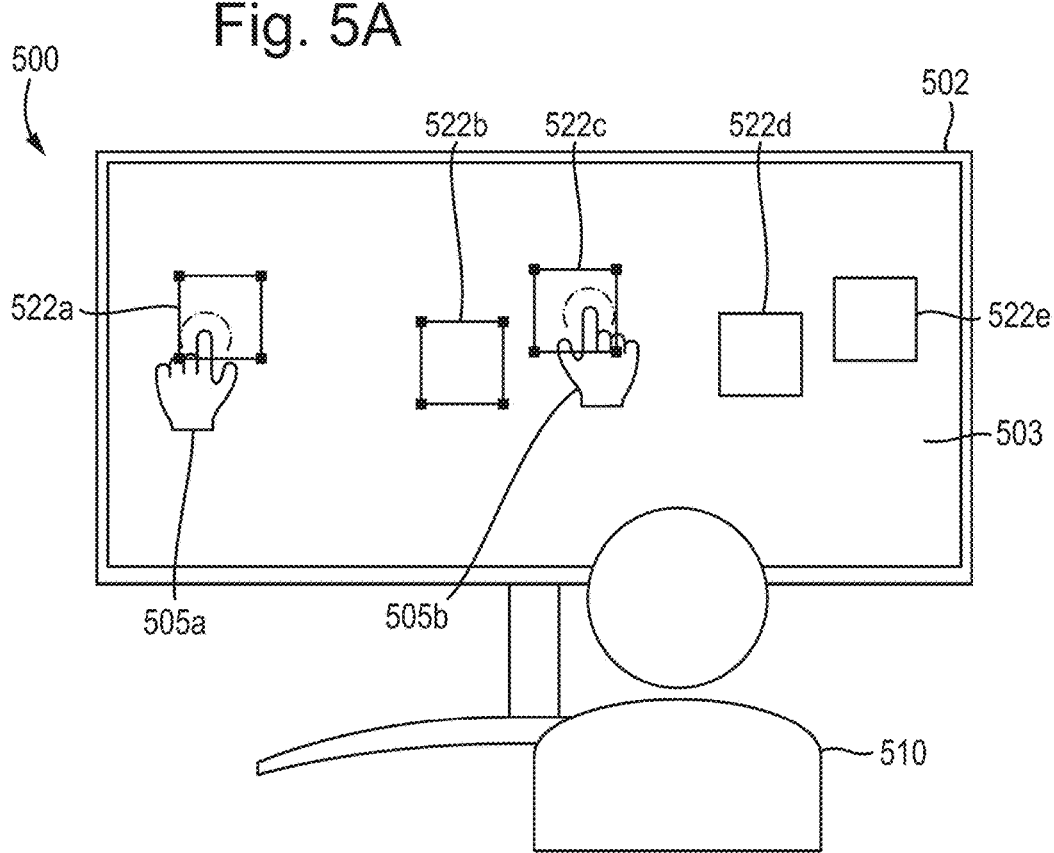
FIGS. 5A to 5E depict a process for positioning display elements on a touchscreen, in accordance with some examples of the disclosure.
Figure 5B:
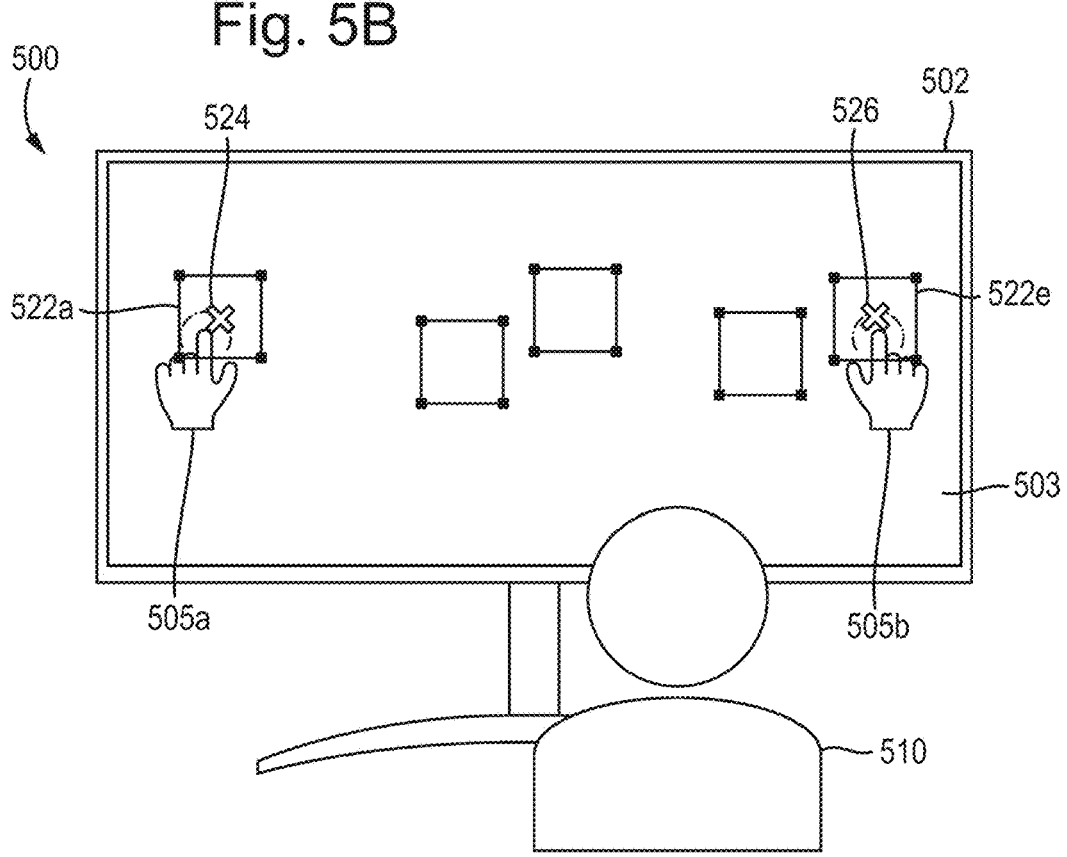

At 418, control circuitry, e.g., control circuitry of user device 502, defines a datum 524 based on the centroid of the first display element 522a, as shown in FIG. 5B. However, in other examples, a datum may be defined based on another geometric property of the first display element 522a. For example, a datum may be based on an edge, a corner, and/or any other appropriate geometric feature of the first display element 522a. For the avoidance of doubt, while the example shown in FIG. 5B shows the datum 524 as a point at the centroid of the first display element 522a, a datum may be any point, line, region, or other geometric feature of the screen 503, e.g., a vertical axis of the screen 503, a horizontal axis of the screen 503, an area of the screen 503, or an edge of the screen 503, corresponding to (or based on) the location of the first touch input.

At 420, control circuitry, e.g., control circuitry of user device 502, determines a centroid of the second display element 522e. For example, control circuitry may determine a location of the second touch input on the screen 503, and determine whether the location of the second touch input is within a boundary of the second display element 522e. In response to determining that the second touch input is within a boundary of the second display element 522e, the centroid of the second display element 522e is determined as the geometric mean of all points along the boundary.

At 422, control circuitry, e.g., control circuitry of user device 502, defines a reference point 526 based on the centroid of the second display element 522e, as shown in FIG. 5B. However, in other examples, a reference point may be defined based on another geometric property of the second display element 522e. For example, a reference point may be based on an edge, a corner, and/or any other appropriate geometric feature of the second display element 522e. For the avoidance of doubt, while the example shown in FIG. 5B shows the reference point 526 as a point at the centroid of the second display element 522a, a reference point may be any point, line, region, or other geometric feature of the screen 503, e.g., a vertical axis of the screen 503, a horizontal axis of the screen 503, an area of the screen 503, or an edge of the screen 503, corresponding to (or based on) the location of the second touch input.

Figure 5C:
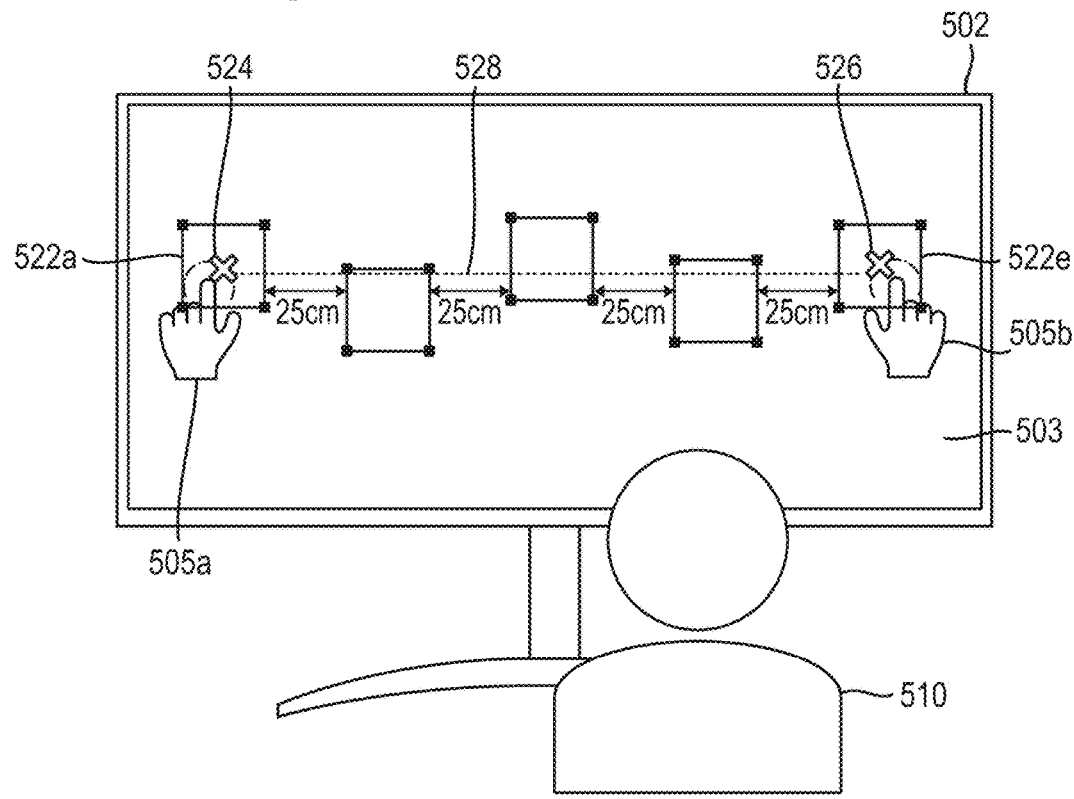

At 424, control circuitry, e.g., control circuitry of user device 502, spaces the display elements 522a-e equally between the datum 524 (D) and the reference point 526 (RP). For example, control circuitry may cause a line 528 to be rendered between the coordinates of the centroid points ($D_{xy}$ and $RP_{xy}$) defining the datum 524 and the reference point 526. Line 528 indicates a current distribution axis, e.g., as shown in FIG. 5C. In order to space the display elements 522a-e equally, control circuitry may calculate a distance between the endpoints of the distribution axis line 428, e.g., $\sqrt{((D_x-RP_x)^2+(D_y-RP_y)^2)}$. Control circuitry may then calculate the sum of the sizes (e.g., a total area) of the selected display elements 522a-e set along the distribution axis. The sum of the sizes is subtracted from the distance between the endpoints of line 528, and is divided by the number of selected display elements 522a-e. The resultant value represents a spacing required to position the display elements 522a-e equally along the distribution axis, e.g., line 528. In response to determining the spacing, control circuitry repositions the display element 522a-e, starting from datum 524 and proceeding to reference point 526 along line 528, such that the spacing along the distribution axis between display elements 522a-e is the calculated spacing value. In the example shown in FIG. 5C, the spacing is set at 25 cm, although any other indication of the spacing may be appropriate, depending on the implementation of the disclosure.

Figure 5D:
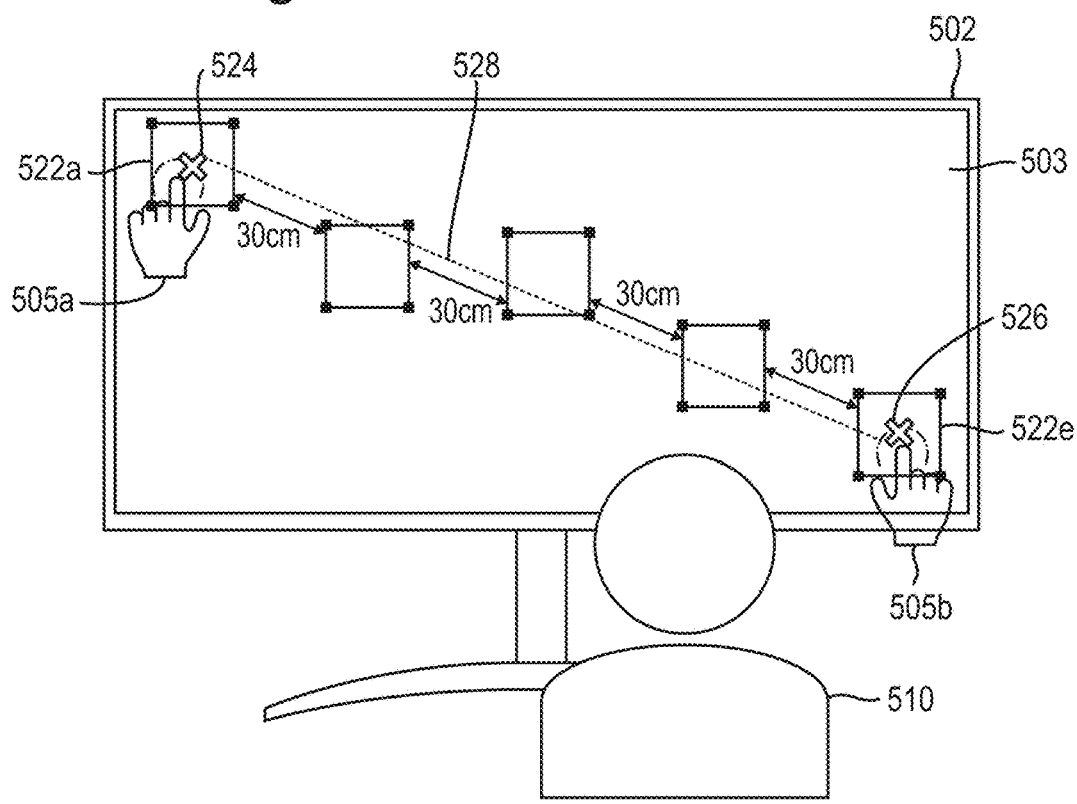
Figure 5E:
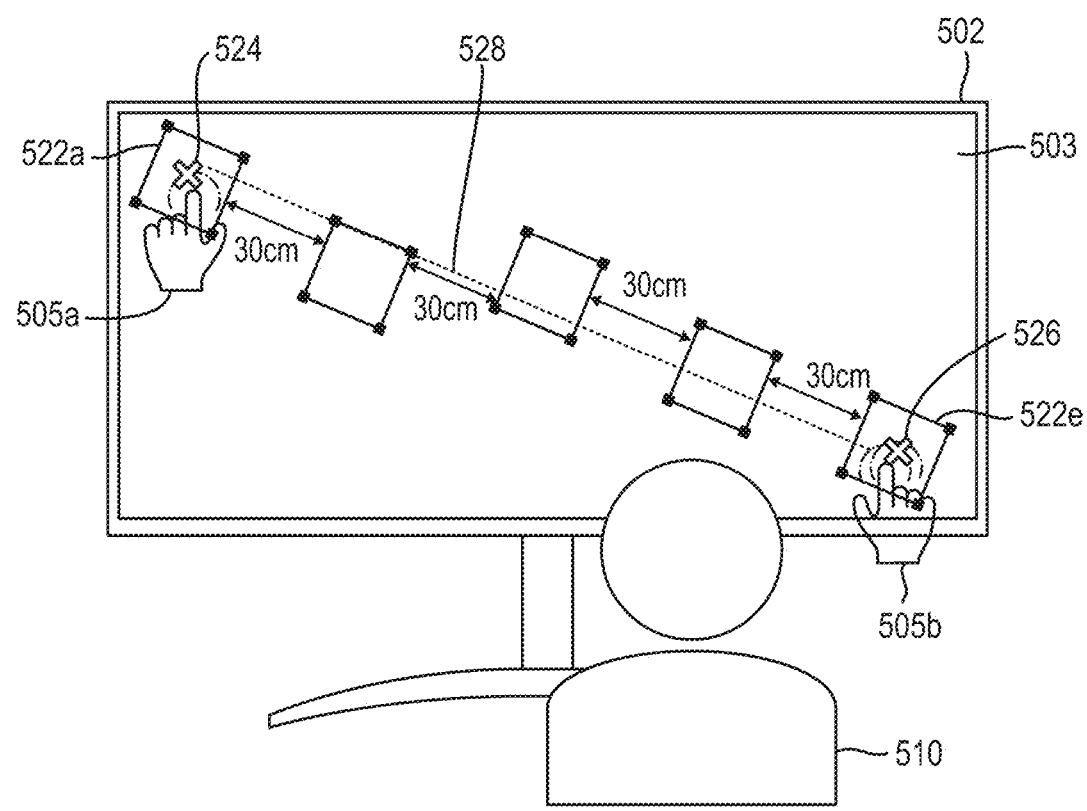

At 426, control circuitry, e.g., control circuitry of user device 502, determines whether the first touch input and/or the second touch input has changed position on the screen 503. For example, control circuitry may determine that hand 505a has been moved upwards on the screen 503 and hand 503b has been moved downward on the screen 503, e.g., as shown in FIG. 5D. When control circuitry determines a change in the position of at least one of the first and second touch inputs, process 400 moves back to 424, where the display elements 522a-e are redistributed according to the change in position of the touch inputs. When control circuitry determines no change in the position of at least one of the first and second touch inputs, process 400 moves to 428, where the position and spacing of the display elements 522a-e is maintained.

Returning to 424, control circuitry, e.g., control circuitry of user device 502, repositions the display elements 522a-e while maintaining equal spacing between them. For example, in FIG. 5D, datum 524 has been repositioned by virtue of user 510 moving the first display element 522a in an upwards manner, and reference point 526 has been repositioned by virtue of user 510 moving the second display element 522e in an downwards manner. As such, control circuitry recalculates the resultant spacing value as described under 424 above. In the example shown in FIG. 5D, line 528 and has become angled diagonally across the screen and has increased in length, and the resultant spacing between the display elements 522a-e has increased, e.g., to 30 cm. In this example, repositioning of the display elements 522a-e has caused process 400 to iterate step 424, causing the display elements 522a-e to maintain an equal spacing, despite the first and second display elements 522a and 522e having changed positions on screen 503. Although not shown in the figures, further movement of hand 505a and/or 505b, causing the repositioning of the datum 524 and reference point 526, would lead to another iteration of 424, thus maintaining equal spacing between the display elements 522a-e. In this manner, the disclosed systems and methods are improved over other approaches, since few inputs are required, e.g., by virtue of few menu selections, to position and reposition the display elements 522a-e on screen 503. In some cases, few inputs can lead to lower operational requirements of system 400.

Returning to 426, control circuitry determines that the first and second touch inputs have not changed position so long as the user 510 does not move their hands 505a, 505b on screen 503.

At 428, control circuitry, e.g., control circuitry of user device 502, maintains the spacing of the display elements 422a-e, e.g., at least until user 510 again moves their hands 505a, 505b.

At 530, control circuitry, e.g., control circuitry of user device 502, determines whether each of the first and second touch inputs comprises multiple touch points, e.g., touch points of multiple fingers of a hand. In the example shown in FIG. 5E, user 510 has added a second touch point to the second touch input, by virtue of touching screen 503 with a second finger in addition to a first finger, which had previously established the second touch input by itself. When control circuitry determines a change in the number of touch points of either or both of the touch inputs, process 400 moves to 432. When control circuitry determines no change in the number of touch points of either or both of the touch inputs, process 400 moves to 434. For the avoidance of doubt, 430 may occur at any appropriate stage of process 400, e.g., after 414, or after 426.

At 432, control circuitry, e.g., control circuitry of user device 502, causes a secondary distribution operation to be carried out. In the example shown in FIG. 5E, the secondary distribution operation comprises a re-orientation of the display element 522a-e. For example, in response to control circuitry determining that the second touch input comprise a multipoint input, control circuitry causes the display element 522a-e to be aligned with the distribution axis (e.g., line 528). In this example, the alignment comprises rotation of the display elements 522a-e such that the top edge of each display element is aligned, e.g., parallel, with the distribution axis, e.g., while maintaining an equal spacing between the display elements 522a-e. However, other secondary distribution operations are envisaged, such as an alignment operation (e.g., where edges of the display elements 522a-e are aligned with each other), and/or a sizing operation (e.g., where the display elements 522a-e are adjusted to be a common size). In some examples, control circuitry may generate a notification to the user 510 that a secondary distribution mode is activated. In some examples, when the secondary distribution mode is activated, process 400 is still implementable as described above. In other examples, when the secondary distribution mode is activated, process 400 may be locked into performing only the secondary distribution operation, e.g., until user 510 reduces the second touch input to a single point touch input. For the avoidance of doubt, 432 is not limited to a multipoint second touch input but applies also to the first touch input. In some examples, a multipoint first touch input may be configured to carry out a different type of secondary distribution operation than a multipoint second touch input. For example, a multipoint first touch input may cause an alignment operation to be performed, while a multipoint second touch input may cause a rotation operation to be performed.

At 434, control circuitry, e.g., control circuitry of user device 502, determines whether the first and/or second touch input has been released, e.g., for a period longer than predetermined period, such as 2 seconds. In response to determining that user 510 has released the first and/or second touch input, process 400 moves to 436, otherwise returning to 424.

At 436, control circuitry, e.g., control circuitry of user device 502, causes the distribution mode to be deactivated, which fixes the display elements 522a-e in position on screen 503. Redistribution of the display elements 522a-e may be caused again by user 510 performing the above steps. In this manner, the user is not required to navigate any menus when performing and reperforming a distribution operation of the display elements 522a-e on screen 503.

The actions or descriptions of FIG. 4 may be done in any suitable alternative orders or in parallel to further the purposes of this disclosure.

Figure 6:
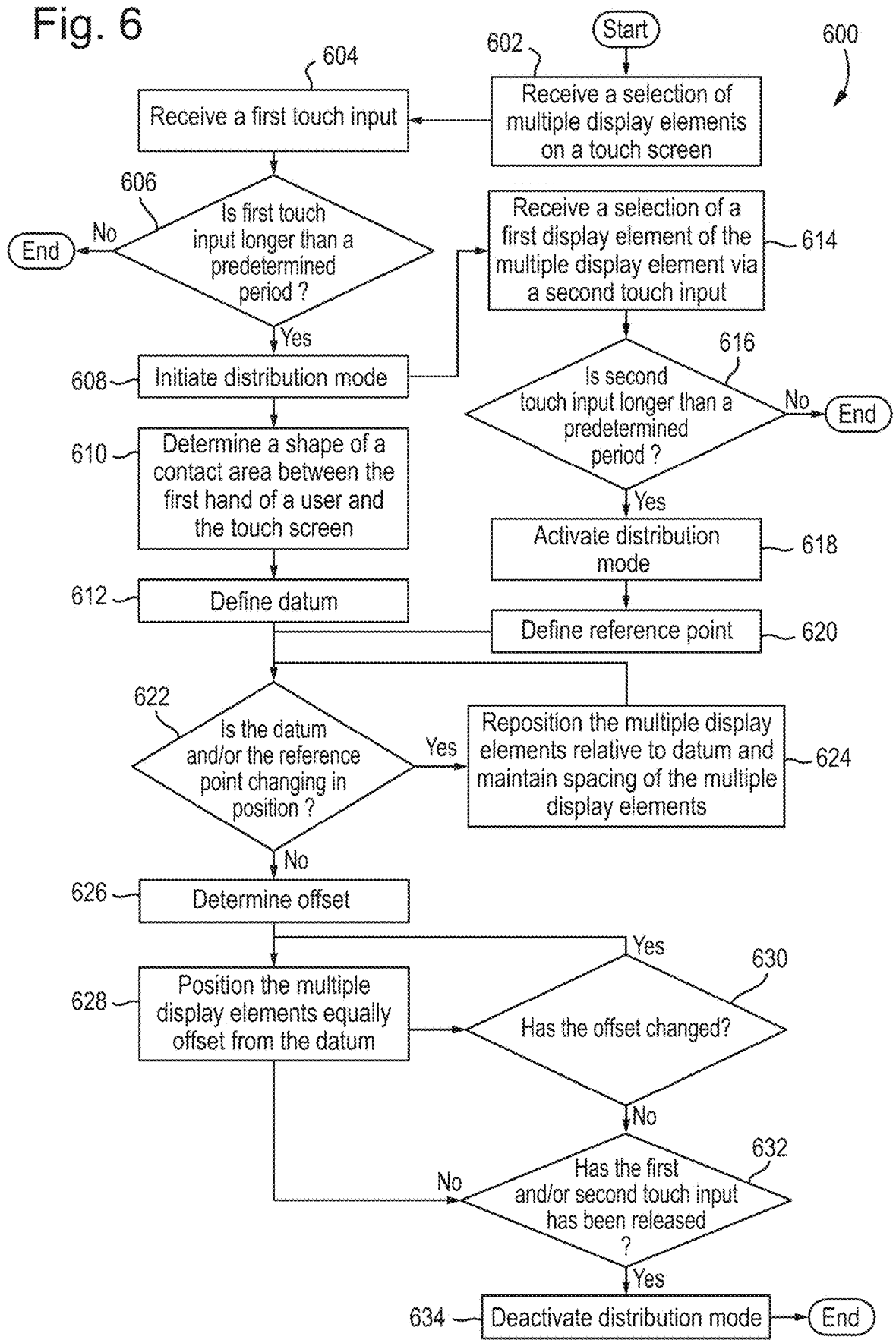
FIG. 6 is a flowchart representing a process for positioning display elements on a touchscreen, in accordance with some examples of the disclosure.

FIG. 6 shows a flowchart representing an illustrative process 600 for positioning display elements. While the example shown in FIG. 6 refers to the use of system 700, as shown in FIGS. 7A-4E, it will be appreciated that the illustrative process 600 shown in FIG. 6 may be implemented, in whole or in part, on system 100, system 200, and/or any other appropriately configured system architecture. For the avoidance of doubt, the term "control circuitry" used in the below description applies broadly to the control circuitry outlined above with reference to FIG. 2. For example, control circuitry may comprise control circuitry of user device 102 and control circuitry of server 104, working either alone or in some combination.

At 602, control circuitry, e.g., control circuitry of user device 702, receives a selection of multiple display elements on a screen 703, e.g., in a manner similar to that described above at 302 and/or 402. In the example shown in FIG. 7A, the display elements 722a-c are selected by sequentially touching a first display elements 722a, 722b and 722c, e.g., with a hand 705a and/or 705b. However, any appropriate selection process may be used, e.g., selection may be made by virtue of a verbal command issued to control circuitry of user device 702. It is appreciated that other display elements may be visible on screen 703, and the display elements shown in FIGS. 7A to 7E are shown merely by way of example and the layout of the display elements is not limited to such.

To add context to the example shown in FIGS. 7A to 7E, each of the display elements may represent a portion or level of the CAD model shown in FIG. 1. For example, display element 722a may represent a top level of the building structure shown in FIG. 1, and display element 722c may represent another level of the building structure. In other examples, the display elements may represent portions of a flowchart, a work flow, a process diagram, an organizational chart, a technical drawing, icons representing media content items in a program guide, elements of a graphical user interface, audio effects (such as a drum beat), visual effects (such as lighting effects), elements of a video game (such as selectable digital objects), photos in an album, objects on a mood board, and/or any other appropriate application where display elements (e.g., objects on a screen and/or in an XR environment) may be positioned. In some examples, the display elements may be positioned solely for the purpose of improving the layout of the display elements on a screen. Additionally or alternatively, the display elements may be positioned, e.g., relative to a datum, to establish a functional relationship between the display elements. For example, the display elements may represent vehicles in a fleet of vehicles, and a datum may represent a task. In this manner, by positioning the display elements (e.g., vehicles) relative to a datum (e.g., a task) the vehicles may be assigned to the task, e.g., in the order or priority indicated by the position of the display elements on the screen. In some examples, the spacing of the display elements (e.g., vehicles) relative to one another may indicate a proportion of the assigned task to be completed by each vehicle. For example, where the display elements (e.g., vehicles) are equally spaced, each vehicle may be assigned the same proportion of the task.

In some examples, receiving a selection of the multiple display elements at 602 is a separate action from the actions involved in distributing the display elements. For example, the selecting of display elements may occur as an independent action, e.g., prior to process 600. As such, steps 404 and 410 described below may occur as discrete steps after step 402. However, in other examples, step 404 and/or 410 may occur as part of the selection of the multiple display elements. For example, a touch input, e.g., a tap and hold, to display element 522a may initiate a selection mode and initiate a distribution mode. Another touch input, e.g., a tap and hold, to the display element 522e may finish the selection mode and activate the distribution mode. In other words, the user input causing the selecting of display element 422a at 402 may comprise the user input described below for 404, and the user input causing the selecting of display element 422e at 402 may comprise the user input described below for 410. The below example follows that the selection of the multiple items occurs as a separate step from the 404 and 410. However, examples contrary to this are not excluded from the scope of the disclosure.

At 604, control circuitry, e.g., control circuitry of user device 702, receives a first touch input to screen 703. In the example shown in FIG. 7A, the first touch input may comprise a touch input resultant from user 710 placing the edge of hand 705a on screen 703. However, in other examples, the first touch input may comprise a touch input resultant from contact between a body part of a user and/or a stylus. In the example shown in FIG. 7A, the first touch input is received to the left of the display elements 722a-c. However, the first touch input may be received anywhere on screen 703, such as at or near to one or more of the display elements, at a point away from the display elements on the screen, at another screen connected to screen 703, such as when multiple displays are used together, or in a XR environment.

At 606, control circuitry, e.g., control circuitry of user device 702, determines whether the first touch input is longer than a predetermined period, such as 2 seconds. When the touch input is less than the predetermined period, process 600 ends and control circuitry returns to a standby mode, or back to 404 when another touch input in received/detected. When the first touch input is equal to or greater than the predetermined period, process 600 moves to 608.

At 608, control circuitry, e.g., control circuitry of user device 702, initiates a distribution mode, e.g., in response to the first touch in put being equal to or greater than the predetermined period. As described above, initiation of the distribution mode is different from activation of the distribution mode. For example, when the distribution mode is initiated, control circuitry may be primed to receive a corresponding touch input (e.g., another touch input) to activate the distribution mode. In the example shown in FIG. 7A, the first input of the user 710 comprises a tap and hold gesture, wherein the action of holding is greater than the predetermined period. In some examples, once the distribution mode has been activated (e.g., as indicated by a notification or an animation), user 710 may remove hand 505a from the screen 503. However, in the example of FIGS. 7A to 7E, user 710 maintains hand 705a in contact with the screen 703, e.g., throughout process 600. Following initiation of the distribution mode, process 600 moves to 610 and 616.

At 610, control circuitry, e.g., control circuitry of user device 702, determines a shape of a contact area between the hand 705a and the touchscreen 703. In some examples, control circuitry may determine the shape of the contact area and compare the determined shape to one or more contact area shapes, e.g., stored in a database. For example, a database may store one or more contact area shapes relating to various types of touch inputs, such as "edge of hand", "hand print", "fingertip pattern", "stylus tip", etc. In some examples, control circuitry compares the shape and not the size of the touch input to one or more contact area shapes. For example, different users may have different sized hands, and, as such, the size a contact area resultant from a first user touching a screen with the edge of their hand will be different from the size a contact area resultant from a second user touching a screen with the edge of their hand. In this manner, the same type of user input from different users may be used at 616. In some examples, control circuitry determines whether the shape of the contact area is within a predetermined threshold of a stored contact area shape. For example, even where the same user places the edge of their hand on the screen, variations in pressure and contact angle may affect the shape of the contact area. As such, a contact shape threshold may be set at, for example, +/−5 or 10 percent of a stored contact area shape, e.g., a boundary of the contact area may be offset in a positive or negative direction by 5 or 10 percent. In this manner, a user need not touch the screen in exactly the same manner each time they provide a type of touch input. In some examples, the touch input may comprise a multitouch input, e.g., resultant from a user placing multiple fingertips on the screen. For example, a first "fingertip pattern" may be a pattern generated by a user placing a finger and a thumb on the screen, and a second "fingertip pattern" may be generated by a user placing two fingers, e.g., adjacent fingers, on the screen. As such, each type of "fingertip pattern" may result in a different contact area shape. In some examples, control circuitry may be configured to return process 600 to 604 should the determined shape of the contact area not match one or more stored contact area shapes. Otherwise, process 600 moves to 618 when the determined shape of the contact area matches one or more stored contact area shapes, e.g., to within a predetermined contact shape threshold.

Figure 7C:
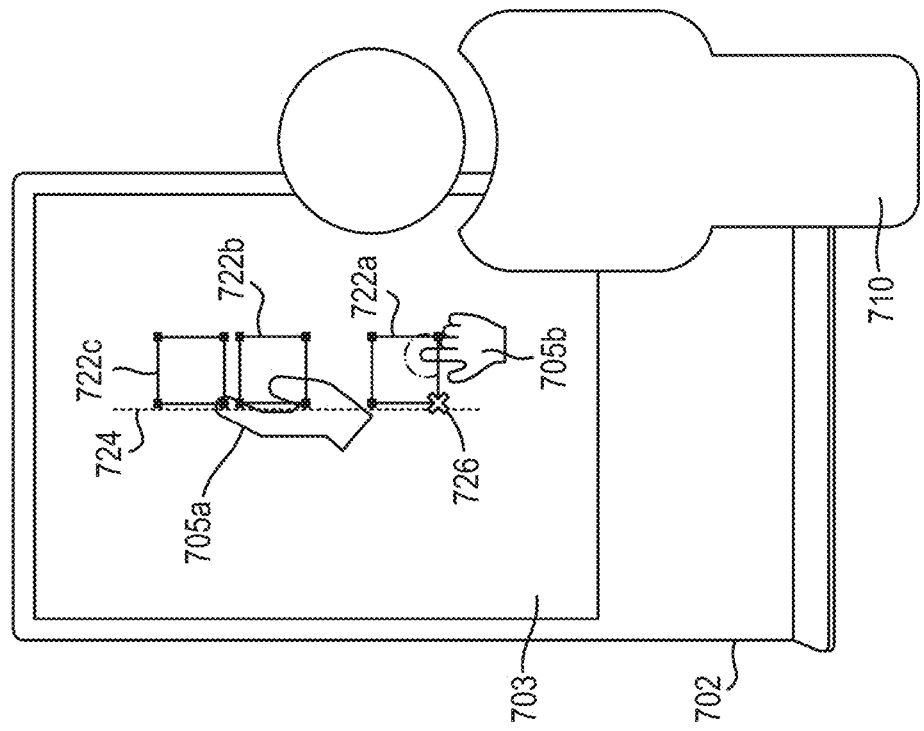
Figure 7D:
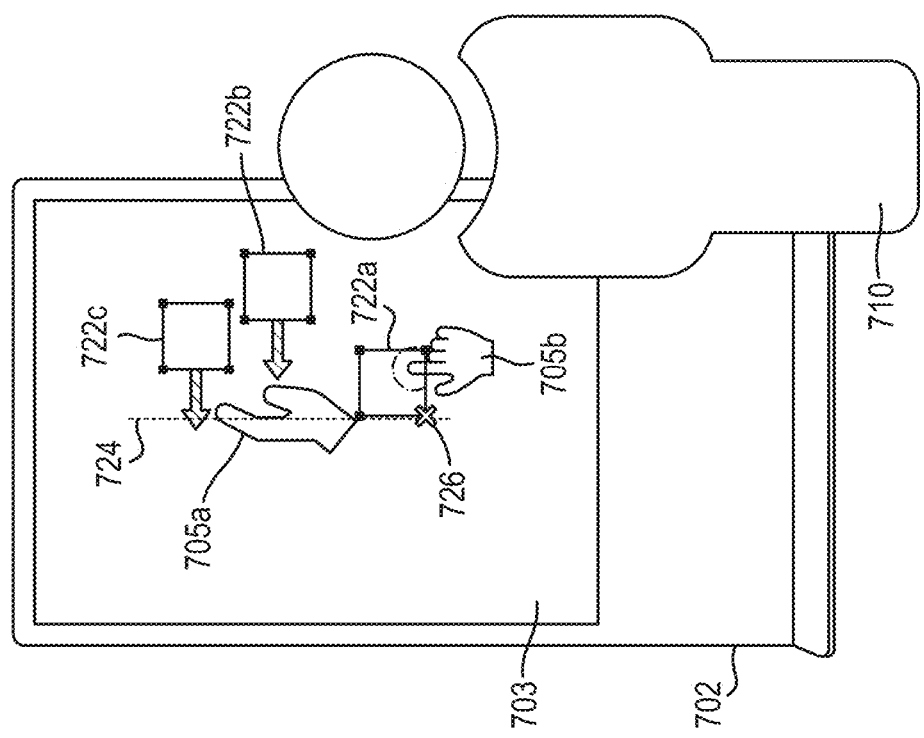

At 612, control circuitry, e.g., control circuitry of user device 702, defines a datum 724. In the example shown in FIG. 7A-7E, the datum 724 is a datum line, e.g., a line positioned based on a property of the shape of the contact area between hand 705a and the touchscreen 703. In some examples, control circuitry may determine a centroid of the contact area. For example, control circuitry may determine the centroid of the contact area the as the geometric mean of all points along a boundary of the shape of the contact area. In some examples, control circuitry may position the datum line such that it runs through the centroid of the shape of the contact area. In some examples, control circuitry may orientate the line in a default orientation, e.g., vertically or horizontally, on the screen 703. Alternatively, control circuitry may determine a longitudinal axis of the shape of the contact area, and orientate the datum line relative to the longitudinal axis of the shape of the contact area. For example, the datum line may be co-linear or parallel with the longitudinal axis of the shape of the contact area. For example, the datum line may be positioned such that it runs through the centroid of the shape of the contact area and orientated to be aligned with the longitudinal axis of the shape of the contact area, e.g., to account for situations where the longitudinal axis of the shape of the contact area does not run through the centroid of the shape of the contact area. However, in other examples, datum line may be defined based on another geometric property of the shape of the contact area. For example, a datum line may be positioned and orientated based on a point at an extent of the shape of the contact area (e.g., a top-most point), an edge, a corner, and/or any other appropriate geometric feature of the shape of the contact area. For the avoidance of doubt, while the example shown in FIG. 7A shows the datum 724 as a line at the centroid of the shape of the contact area, datum 724 may be any point, line, region, or other geometric feature of the screen 703, e.g., a vertical axis of the screen 703, a horizontal axis of the screen 703, an area of the screen 703, or an edge of the screen 703, corresponding to (or based on) the location of the first touch input.

In the example shown in FIG. 7A-7E, the user 710 has orientated hand 705a in a vertical manner, resulting in a contact area shape that has a vertical longitudinal axis. As such, datum 724 comprises a line running vertically on the screen through a region of contact between hand 705a and screen 703. In some examples, control circuitry may provide an indication or notification to the user 710 once datum 724 has been established. In some examples, datum 724 remains in place so long as user 710 maintains their hand 705a in contact with the screen 703. In other examples, once datum 724 has been established, datum 724 may remain in place even when user 724 removes their hand 705a from the screen 703. In some examples, control circuitry may provide the user 710 with an option to remove their hand 705a and maintain the datum 724 on the screen.

At 614, control circuitry, e.g., control circuitry of user device 702, receives a selection of a first display element of the multiple display elements via a second touch input to screen 703. In the example shown in FIG. 7B, user 710 selects display element 722a as the first display element with hand 505b. However, in another example, the second touch input may be received anywhere on screen 703, such as at another of the display elements or at a point away from the display elements on the screen 703, at another screen connected to screen 503, such as when multiple displays are used together, or at a location in an XR environment.

At 616, control circuitry, e.g., control circuitry of user device 702, determines whether the second touch input is longer than a predetermined period, such as 2 seconds. When the touch input is less than the predetermined period, process 600 ends and control circuitry returns to a standby mode, or back to 610 when another touch input is received/detected. When the second touch input is equal to or greater than the predetermined period, process 600 moves to 618.

At 618, control circuitry, e.g., control circuitry of user device 702, activates the distribution mode, e.g., in response to receiving the first touch input for a period longer than a first predetermined period, and the second touch input for a period longer than a second predetermined period (which may be set as the same duration or a different duration as the first predetermined period).

At 620, control circuitry, e.g., control circuitry of user device 702, defines a reference point 726 of the first display element 722a, as shown in FIG. 7B. For example, reference point 726 may be defined based on any geometric property of the first display element 722a. In the example shown in FIG. 7B, reference point 726 is defined based on a lower left corner of the first display element 722a, e.g., since this is a geometric feature of the first display element 722a that is closest to datum 724. However, while the example shown in FIG. 7B shows the reference point 726 as a point at the lower left corner of the first display element 722a, a reference point may be any point, line, region, or other geometric feature of the screen 703, e.g., a vertical axis of the screen 703, a horizontal axis of the screen 703, an area of the screen 703, or an edge of the screen 703, corresponding to (or based on) the location of the second touch input and/or the shape of the first display element 722a. In some examples, reference point 726 may be defined based on the centroid of the first display element 722a. For example, control circuitry may determine a location of the second touch input on the screen 703, and determine whether the location of the second touch input is within a boundary of the first display element 722a. In response to determining that the second touch input is within a boundary of the first display element 722a, the centroid of the first display element 722a is determined as the geometric mean of all points along the boundary. In some examples, control circuitry may indicate an alignment mode associated with the location of the reference point on the first display element 722a. For example, control circuitry may set a flag to indicate a leading edge alignment mode when the reference point 726 is defined based on a geometric feature of the first display element 722a that is closest to datum 724. In a leading edge alignment mode, control circuitry may aim to align the leading edges (or leading points) of the display elements 722a-e with one another and/or the datum 724. In examples where the reference point 726 is defined based on the centroid of the first display element 722a, control circuitry may set a flag indicating a center alignment mode, in which control circuitry may aim to align the centroids of the display elements 722a-e with one another and/or the datum 724. In examples where the reference point 726 is defined based on a geometric feature of the first display element 722a that is furthest from datum 724, control circuitry may set a flag indicating a trailing edge alignment mode, in which control circuitry may aim to align the trailing edges (or trailing points) of the display elements 722a-c with one another and/or the datum 724. In the example shown in FIG. 7B, the reference point 726 is defined as the lower left corner of the first display element 722a, which is a geometric feature of the first display element 722a that is closest to datum 724. Thus, in this example, a leading edge alignment mode is set. In some examples, the alignment mode may be switched, e.g., manually, at 620, in response to a user command.

At 622, control circuitry, e.g., control circuitry of user device 702, determines whether each of the datum 724 and the reference point 726 is changing in position. For example, should user 710 move hand 705a and/or hand 705b, e.g., while maintaining contact with screen 703, the position of the datum 724 and/or the reference point will change on the screen 703. In the example shown in FIG. 7B, user 710 moves hand 705a from left to right across the screen 703 and moves hand 705b from right to left across the screen 703. In other words, user 710 modifies each of the first and second touch inputs to cause the location of the datum 724 and the reference point 726 to change relative to each other. For the avoidance of doubt, in some examples, user may move only one hand to have similar effect, e.g., where user 710 has already removed hand 705*a* from the screen, thereby setting datum 724 in position. When control circuitry determines that at least one of the datum 724 and the reference point 726 is changing in position, process 600 moves to 624. When control circuitry determines that the datum and the reference point are not changing in position, process 600 moves to 626.

At 624, control circuitry, e.g., control circuitry of user device 702, causes the display elements 722*a-c*, to be moved closer to the datum 724, while maintaining the spacing of display elements 722*a-c*, relative to each other. Process 600 cycles through 624 and 622 until control circuitry determines that there is no change in the position of the datum 724 and reference point 726, e.g., as a result of user 710 ceasing to move hand 705*a* and 705*b* for longer than a predetermined period, e.g., 2 seconds. In such a case, it may be determined that user 710 has positioned the display elements 722*a-c* at a desired position on the screen. In the example shown in FIG. 7C, user 710 has repositioned the display elements 722*a-c* such that reference point 726 is coincident with datum 724. In some examples, control circuitry may be configured to cause reference point 726 to snap to datum 724, e.g., as user 710 bring the leading edge of display element 722*a* to within a predetermined distance, e.g., 5 cm, of datum 724. However, in other example, user 710 may position the display elements 722*a-e* at any appropriate location on screen 703 relative to datum 724.

At 626, control circuitry, e.g., control circuitry of user device 702, determines an offset between the datum 724 and the reference point 726. In the example shown in FIG. 7C, the offset is zero, since the datum 724 and the reference point 726 are coincident. However, should the user 710 position the display elements 722*a-c* elsewhere on screen 703, the offset may be determined to be any appropriate non-zero value, e.g., 10 cm, or 1.5 m. In some examples, the offset is determined as the shortest distance between the datum 724 and the reference point 726, e.g., in a direction orthogonal to the datum line of FIGS. 7A to 7E.

At 628, control circuitry, e.g., control circuitry of user device 702, positions the display elements 722*a-c* equally offset from the datum 724. In the example shown in FIG. 7D, control circuitry has modified the spacing of the display elements 722*a-c* relative to each other, and moved display elements 722*b* and 722*c* such that the leading edges of display elements 722*b* and 722*c* are coincident with the datum line.

At 630, control circuitry, e.g., control circuitry of user device 702, determines whether the offset has changed, e.g., as a result of user 710 again moving hand 705*a* and/or 705*b*. In the example shown in FIG. 7E, user 710 has moved hand 705*b* further to the left, which causes display elements 722*a-c* to be repositioned. In some examples, the display elements 722*a-c* may be repositioned anywhere on screen 703 while maintaining the alignment between the display elements 722*a-c*, e.g., while maintaining an equal offset of the display elements 722*a-c* from the datum line. In the example shown in FIG. 7E, the display elements 722*a-c* have been repositioned such that the reference point 726 is offset from the datum line by a distance D. As mentioned above, distance can be any appropriate value based on the further movement of the user's hand(s). However, in FIG. 7E, distance D is selected, e.g., by control circuitry, as the maximum width of display element 722*a*, e.g., to cause a trailing edge (or point) of display element 722*a* to be coincident with the datum line. In other words, control circuitry may be configured to cause a switch in the alignment mode, e.g., from leading edge alignment to training edge alignment (or center alignment), in response to user 710 further moving display element 722*a*. In some examples, the display elements 722*a-c* may snap between positions (or alignment modes) responsive to user 710 further moving display element 722*a* around screen 703. When control circuitry determines a change in the offset (e.g., a change in the position of the reference point 726 and/or the datum 724), process 600 moves back to 628, where the display elements 722*a-c* are positioned (i.e., repositioned) maintaining an equal offset from the datum 724. When control circuitry control circuitry determines no change in the offset, process 600 moves to 630.

Figure 7E:
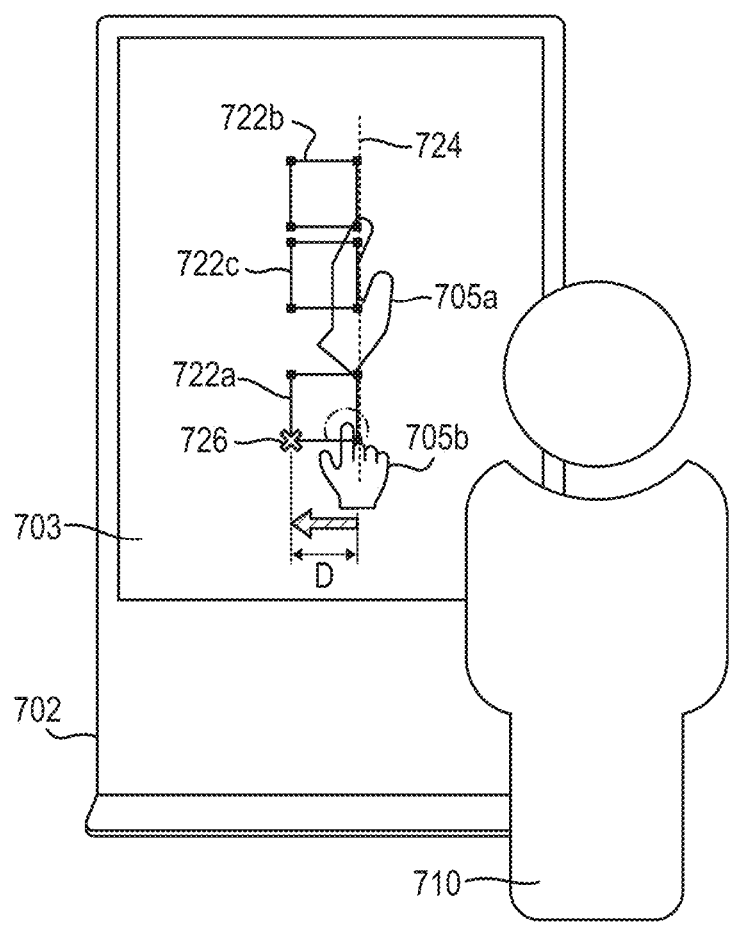

At 628, control circuitry repositions the display elements 722*a-c* as show in FIG. 7E.

At 630 control circuitry, e.g., control circuitry of user device 702, determines whether the first and/or second touch input has been released, e.g., for a period longer than predetermined period, such as 2 seconds. In response to determining that user 710 has released the first and/or second touch input, process 600 moves to 634, otherwise returning to 628.

At 634, control circuitry, e.g., control circuitry of user device 702, causes the distribution mode to be deactivated, which fixes the display elements 722*a-c* in position on screen 703. Redistribution of the display elements 722*a-c* may be caused again by user 710 performing the above steps. In this manner, the user is not required to navigate any menus when performing and reperforming a distribution operation of the display elements 722*a-c* on screen 703.

The actions or descriptions of FIG. 6 may be done in any suitable alternative orders or in parallel to further the purposes of this disclosure.

Figure 8A:
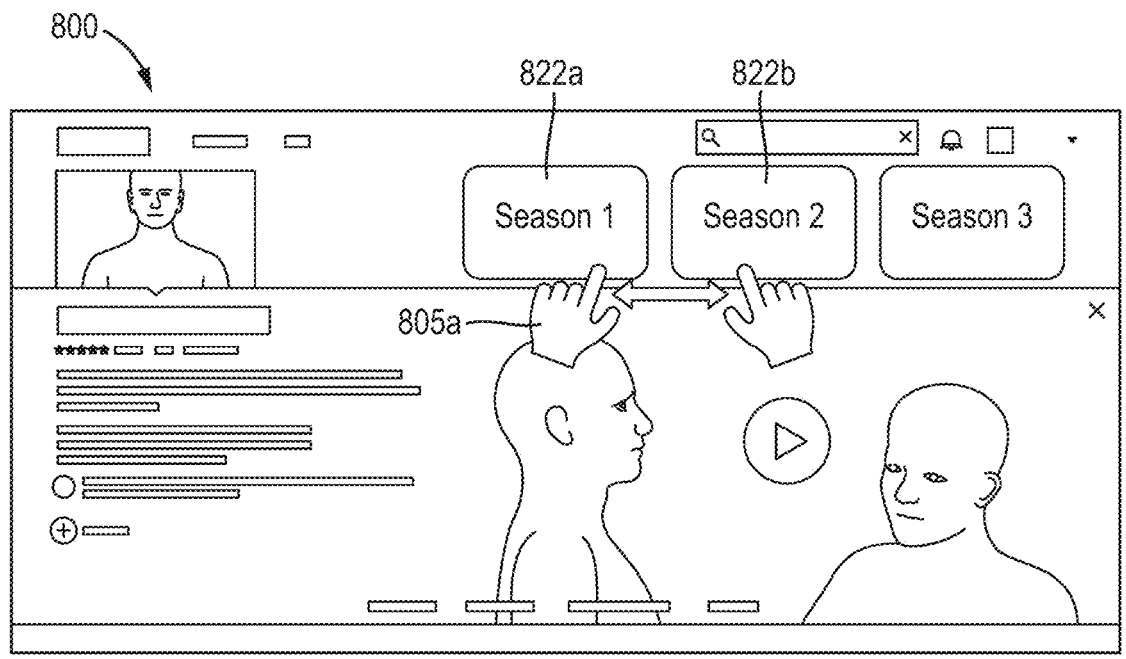
FIGS. 8A and 8B depict positioning display elements on a screen, in accordance with some examples of the disclosure.
Figure 8B:
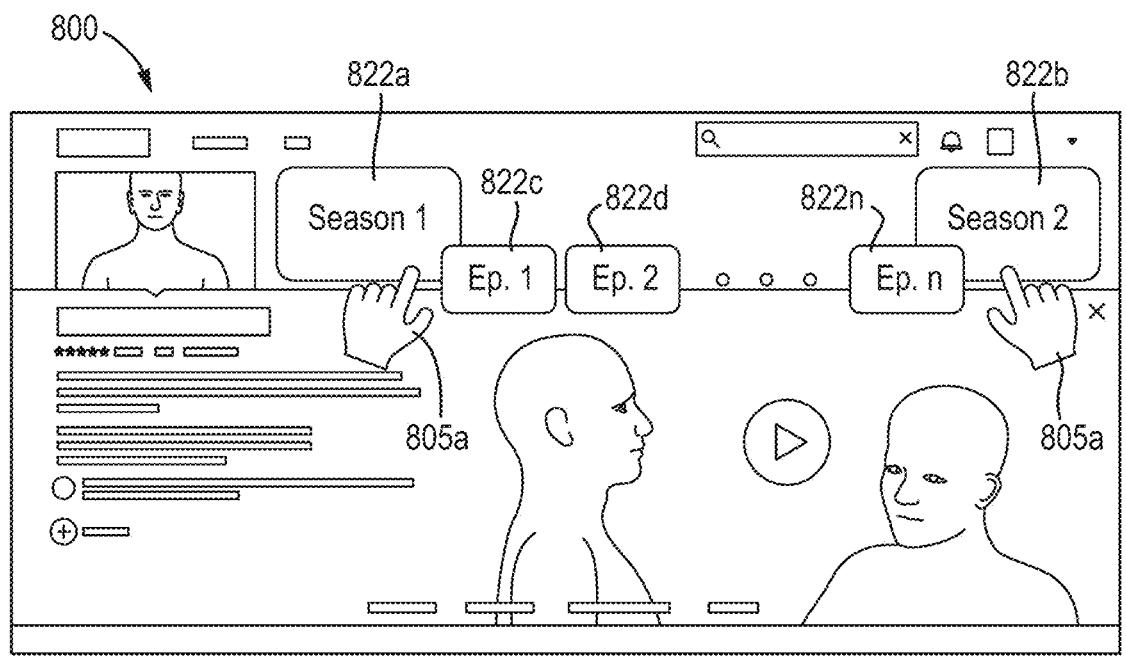

FIGS. 8A and 8B depict an example of applying processes described herein in a media guide application 800. For example, FIGS. 8A and 8B show a media guide application 800 in which a user is browsing media content, such as a TV show accessible using an OTT streaming service. In the example shown in FIGS. 8A and 8B, the user is browsing the media content using a touchscreen device. However, the following example is equally applicable to browsing content in an XR environment, e.g., using a XR headset. In FIG. 8A, a user inputs a first touch input and a second touch input to select icons representing different seasons of the TV show. For example, a first touch input may be received by hand 805*a*, thereby selecting a first display element 822*a*, representing Season 1 of the TV show (e.g., in manner similar to 304 of process 300, or 404, 406, 408, 416 and 418 of process 400). A second touch input may be received by hand 805*b*, thereby selecting a second display element 822*b*, representing Season 2 of the TV show (e.g., in manner similar to 306 of process 300, or 410, 412, 414, 420 and 422 of process 400). Following the selection of the display elements 822*a* and 822*b*, user moves their hands 805*a* and 805*b* apart, thus dragging display elements 822*a* and 822*b* away from each other.

In response to the display elements 822*a* and 822*b* becoming separated, e.g., by a predetermined distance, control circuitry causes one or more further display elements 822*b*, 822*c* . . . 822*n* to be generated and presented on the media guidance application 800. In this example, the further display elements correspond to various episodes of Season 1 of the TV show, e.g., the episodes thought of as in between the icons representing Season 1 and Season 2. In some examples, the number of display elements representing episodes may be a function of the distance by which the user separates the icons representing the seasons. For example, a greater separation of the display elements representing the seasons may cause a greater number of display elements representing episodes to be generated for presentation. In some examples, the display elements representing episodes may be generated based on a user viewing history, e.g., to display recently watched or a next unwatched episode. In the example shown in FIG. 8B the display elements 822c, 822d . . . 822n are spaced equally between the display elements 822a and 822b (e.g., in a manner similar to that described at 308 of process 300, or 424, 426 and 428 of process 400).

Figure 9:
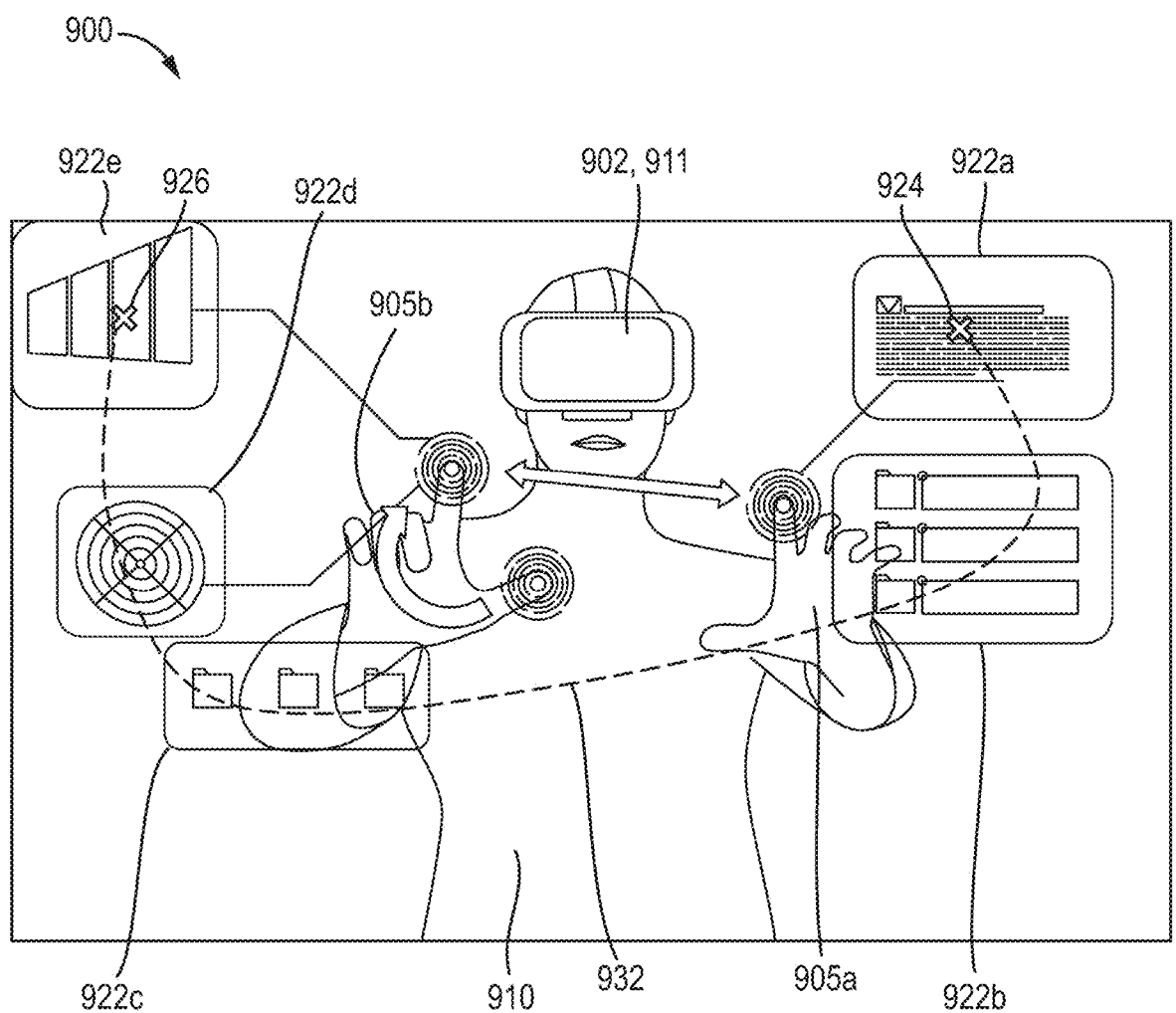
FIG. 9 depicts positioning display elements on a screen, in accordance with some examples of the disclosure.

FIG. 9 depicts an example of applying the processes described herein in an XR environment 900. For example, user 910 is using a user device 902, e.g., a head-mounted display 911, to view display elements 922a-e in the XR environment 900. In the example, user 910 may issue one or more commands, e.g., using a controller (such as a haptic input device), a voice input and/or a gesture, to select the display elements 922a-e in the XR environment 900. The selection of the display elements 922a-e may be carried out in a manner similar to 302 of process 300, 402 of process 400, or 602 of process 600. In FIG. 9, user 910 defines datum 924 as a point within a boundary of the display element 922a by virtue of a first input made by a finger of hand 905a (e.g., in manner similar to 304 of process 300, 404-408, 416 and 418 of process 400, or 604-612 of process 600), and reference point 926 as a point within a boundary of the display element 922e by virtue of a second input made by a finger of hand 905b (e.g., in manner similar to 306 of process 300, 410-414, 420 and 422 of process 400, or 614-620 of process 600). In the example shown in FIG. 9, control circuitry connects datum 924 and reference point 926 with curve 932. For example, control circuitry may select one of a set of predefined pathways, e.g., lines, curves, surfaces, etc., as a pathway connecting datum 924 and reference point 926. Additionally or alternatively, control circuitry may select a pathway to connect datum 924 and reference point 926 based on one or more parameters of the XR environment, such as the field of view of the user 910 and/or other objects visible in the XR environment. In FIG. 9, control circuitry selects curve 932 based on an extent of movement of the user, e.g., such that display elements 922a-e may be positioned within reach of the user 910 in the XR environment. Additionally or alternatively, user 910 may define how datum 924 and reference point 926 are connected. For example, user 910 may connect datum 924 and reference point 926 using one or more further touch inputs, e.g., by drawing curve 932 in the XR environment, or by manually selecting one of a set of predefined pathways.

In the example shown in FIG. 9, control circuitry positions the display elements 922a-e along curve 932 and between the datum 924 and the reference point 926. User 910 may control the spacing between the display elements 922a-e by adjusting the separation between the first and second inputs. For example, the display elements 922a-e may be spaced equally along curve 932, or may be spaced according to a predetermined spacing pattern. In addition, the second input of the user 910 comprises a multipoint input, e.g., by virtue of an input made by the thumb of hand 905b. In FIG. 9, the user 910 may control the orientation of the display elements 922a-e by adjusting the relative angular position between the finger and thumb of hand 905b. The example shown in FIG. 9 may be implemented in a process flow or work flow, e.g., by allocating the display elements 922a-e (e.g., resources) to particular portions of a process, e.g., represented by curve 924. Additionally or alternatively, the example shown in FIG. 9 may be implemented in an XR gaming environment, e.g., by allocating the display elements 922a-e (e.g., gaming resources, such as an inventory, a map, etc.) to particular locations in the user's field of view in the XR environment.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method of bi-manual operation of a touchscreen, the method comprising:
   selecting, using control circuitry, multiple display elements displayed on the touchscreen;
   receiving, using control circuitry, a first input resultant from sustained contact between a first hand of a user and the touchscreen;
   initiating a distribution mode based on the sustained contact between the first hand of the user and the touchscreen having a first duration equal to or exceeding a first predetermined time;
   defining a datum on the touchscreen based on the first input resultant from the sustained contact between the first hand of the user and the touchscreen;
   receiving, using control circuitry, a second input resultant from sustained contact between a second hand of the user and the touchscreen;
   defining a reference point on the touchscreen based on the sustained contact between the second hand of the user and the touchscreen;
   activating the distribution mode based on the sustained contact between the second hand of the user and the touchscreen having a second duration equal to or exceeding a second predetermined time, wherein each of the selected multiple display elements is animated to move in place to signify distribution mode is activated; and
   in response to activating the distribution mode, positioning, using control circuitry, the multiple display elements to be displayed on the touchscreen in an evenly spaced manner relative to the datum and the reference point.

2. The method of claim 1, wherein positioning the multiple display elements comprises:
   spacing the multiple display elements equally between the datum and the reference point.

3. The method of claim 2, wherein:
   receiving the first input comprises receiving a selection of a first display element of the multiple display elements; and receiving the second input comprises receiving a selection of a second display element of the multiple display elements; and the method further comprises:

determining a centroid of the first display element thereby defining the datum; determining a centroid of the second display element thereby defining the reference point.

4. The method of claim 1, wherein positioning the multiple display elements comprises:

determining an offset distance between the datum and the reference point; and aligning the multiple display elements equally offset from the datum at the offset distance.

5. The method of claim 4, wherein:

receiving the second input comprises receiving a selection of a first display element of the multiple display elements; and the method further comprises:

determining a centroid of the first display element thereby defining the reference point; and determining the offset distance based on the position of the centroid of the first display element relative to the datum.

6. The method of claim 1, the method comprising:

determining a shape of a contact area between the first hand of a user and the touchscreen; and defining the datum in response to the shape of the contact area corresponding to one or more predetermined shapes.

7. The method of claim 6, the method comprising:

determining an axis of the shape of a contact area between the first hand of a user and the touchscreen; and aligning a datum line along the axis of the shape of a contact area thereby defining the datum.

8. The method of claim 1, wherein the second input comprise a swipe gesture and the reference point is the end of the swipe gesture.

9. The method of claim 1, the method comprising:

determining whether the second input comprises multiple touch points; and wherein positioning the multiple display elements to be displayed on the touchscreen comprises rotationally positioning the multiple display elements relative to each other in response to determining that the second input comprises multiple touch points.

10. The method of claim 1, the method comprising:

determining a first duration of the sustained contact of the first input;

determining a second duration of the sustained contact of the second input;

determining whether the first and second durations are greater than a predetermined period; activating a distribution mode in response to the first and second durations being greater than the predetermined period;

determining an end of the first or second input; and deactivating the distribution mode in response to determining the end of the first or second input.

11. A system of bi-manual operation of a touchscreen, the system comprising:

memory;

control circuitry configured to:

select multiple display elements stored in memory and displayed on the touchscreen;

receive a first input resultant from sustained contact between a first hand of a user and the touchscreen;

initiate a distribution mode based on the sustained contact between the first hand of the user and the touchscreen having a first duration equal to or exceeding a first predetermined time;

defining a datum on the touchscreen based on; the first input resultant from the sustained contact between the first hand of the user and the touchscreen;

receive a second input resultant from sustained contact between a second hand of the user and the touchscreen;

define a reference point on the touchscreen based on the sustained contact between the second hand of the user and the touchscreen;

activate the distribution mode based on the sustained contact between the second hand of the user and the touchscreen having a second duration equal to or exceeding a second predetermined time, wherein each of the selected multiple display elements is animated to move in place to signify distribution mode is activated; and in response to activating the distribution mode, position the multiple display elements to be displayed on the touchscreen in an evenly spaced manner relative to the datum and the reference point.

12. The system of claim 11, wherein, when positioning the multiple display elements, the control circuitry is configured to space the multiple display elements equally between the datum and the reference point.

13. The system of claim 12, wherein:

receiving the first input comprises receiving a selection of a first display element of the multiple display elements; and receiving the second input comprises receiving a selection of a second display element of the multiple display elements; and the control circuitry is further configured to:

determine a centroid of the first display element thereby defining the datum;

determine a centroid of the second display element thereby defining the reference point.

14. The system of claim 11, wherein, when positioning the multiple display elements, the control circuitry is configured to:

determine an offset distance between the datum and the reference point; and align the multiple display elements equally offset from the datum at the offset distance.

15. The system of claim 14, wherein:

receiving the second input comprises receiving a selection of a first display element of the multiple display elements; and the control circuitry is further configured to:

determine a centroid of the first display element thereby defining the reference point; and determine the offset distance based on the position of the centroid of the first display element relative to the datum.

16. The system of claim 11, wherein the control circuitry is further configured to:

determine a shape of a contact area between the first hand of a user and the touchscreen; and define the datum in response to the shape of the contact area corresponding to one or more predetermined shapes.

17. The system of claim 16, wherein the control circuitry is further configured to: determine an axis of the shape of a contact area between the first hand of a user and the touchscreen; and
- align a datum line along the axis of the shape of a contact area thereby defining the datum.

18. The system of claim 11, wherein the second input comprise a swipe gesture and the reference point is the end of the swipe gesture.

19. The system of claim 11, wherein the control circuitry is further configured to:
- determine whether the second input comprises multiple touch points; and
- position the multiple display elements to be displayed on the touchscreen by rotationally positioning the multiple display elements relative to each other in response to determining that the second input comprises multiple touch points.

20. The system of claim 11, wherein the control circuitry is further configured to:
- determine a first duration of the sustained contact of the first input;
- determine a second duration of the sustained contact of the second input;
- determine whether the first and second durations are greater than a predetermined period;
- activate a distribution mode in response to the first and second durations being greater than the predetermined period;
- determine an end of the first or second input; and
- deactivate the distribution mode in response to determining the end of the first or second input.

* * * * *